March 31, 1953 J. K. BRUCE 2,633,251
PALLETIZER
Filed Feb. 2, 1948 10 Sheets-Sheet 3

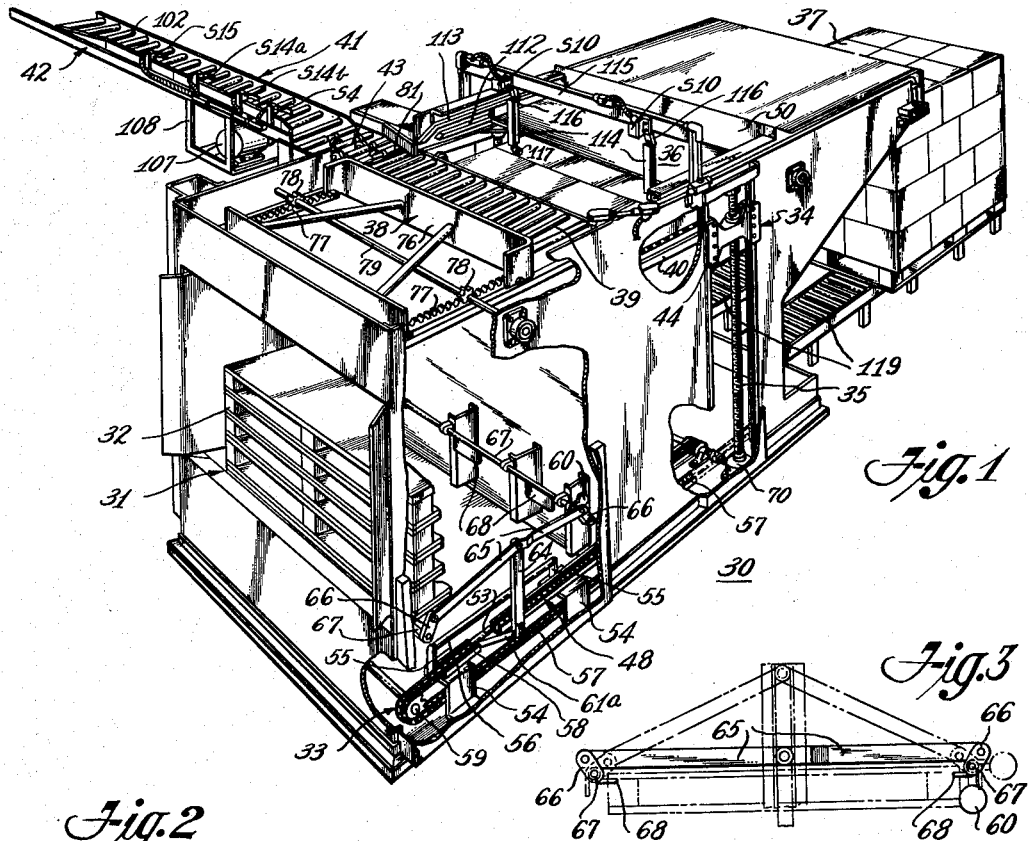
Fig.1
Fig.3
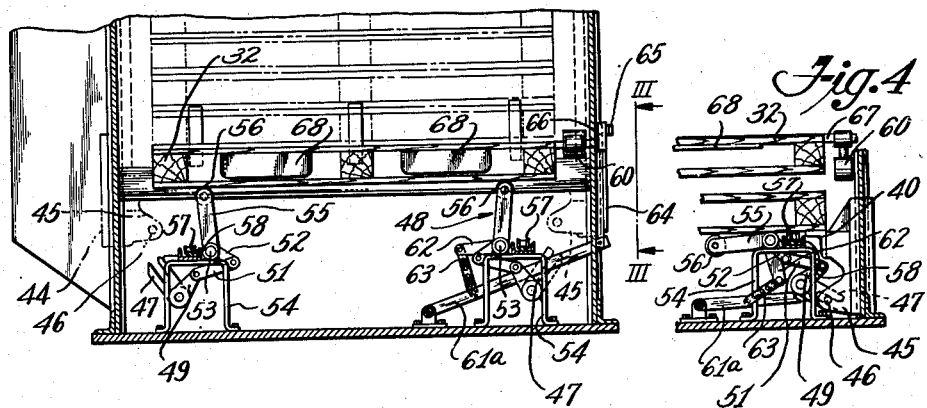
Fig.2
Fig.4
INVENTOR.
JOHN K. BRUCE
BY Harold W Mattingly
Attorney

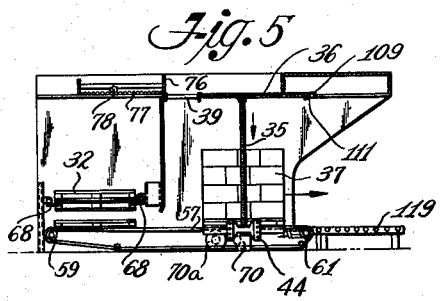
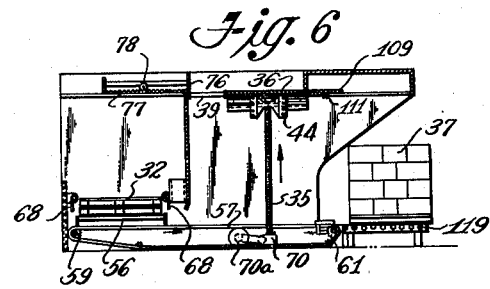
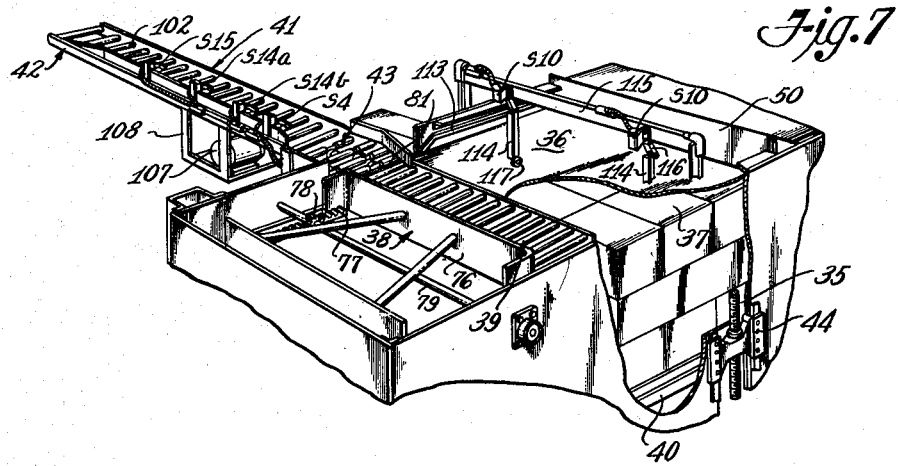
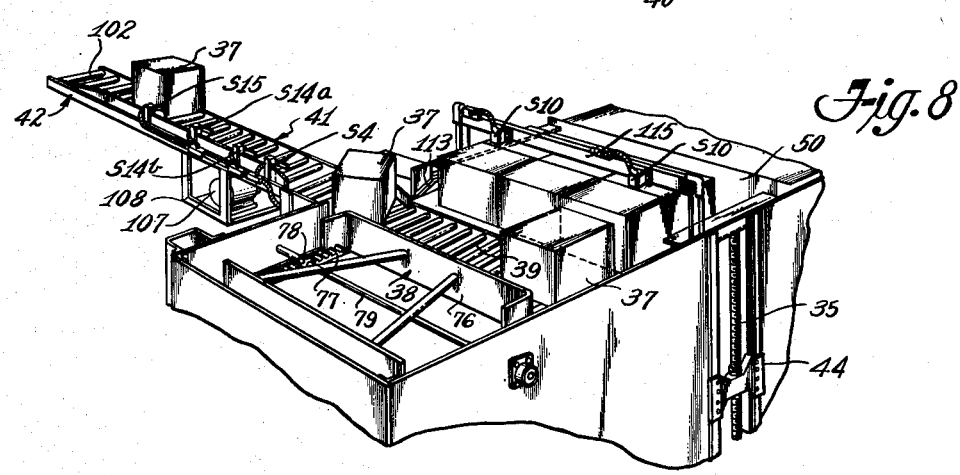

INVENTOR.
JOHN K. BRUCE
BY
Harold W. Mattingly
Attorney

March 31, 1953  J. K. BRUCE  2,633,251
PALLETIZER
Filed Feb. 2, 1948  10 Sheets-Sheet 4

INVENTOR.
JOHN K. BRUCE
BY Harold W. Mattingly
Attorney

March 31, 1953 J. K. BRUCE 2,633,251
PALLETIZER
Filed Feb. 2, 1948 10 Sheets-Sheet 5
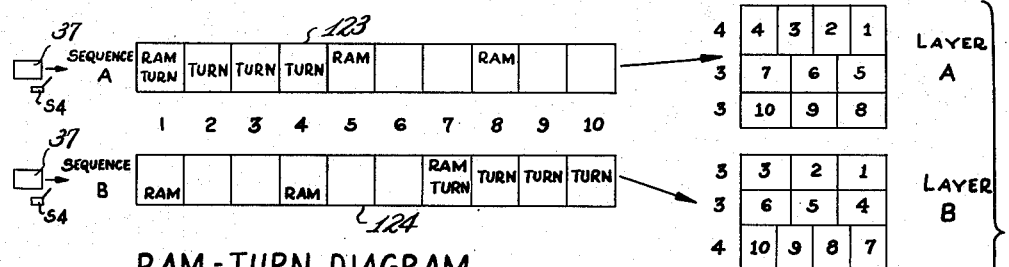
RAM-TURN DIAGRAM
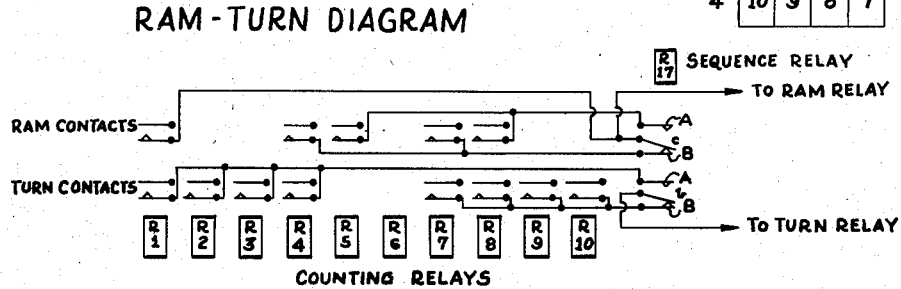
Fig.19
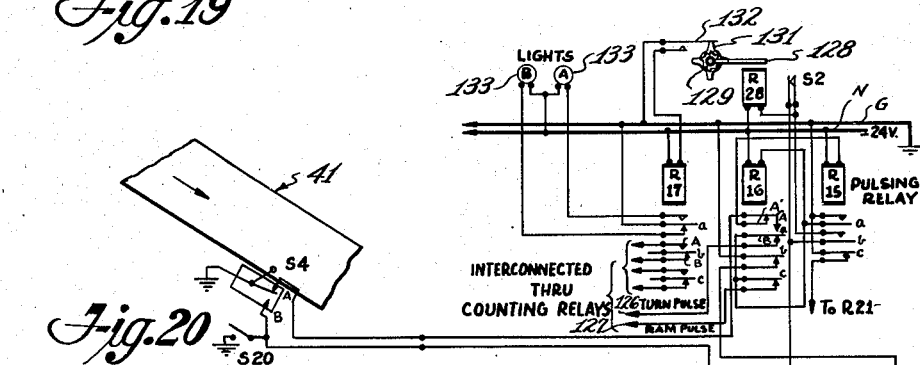
Fig.20
COUNTING, PULSE & SEQUENCE CIRCUITS
INVENTOR.
JOHN K. BRUCE
BY Harold W. Mattingly
Attorney March 31, 1953  J. K. BRUCE  2,633,251
PALLETIZER
Filed Feb. 2, 1948  10 Sheets-Sheet 6

BASIC TURN CIRCUIT

BASIC RAM CIRCUIT

INVENTOR.
BY JOHN K. BRUCE
Harold W Mattingly
Attorney

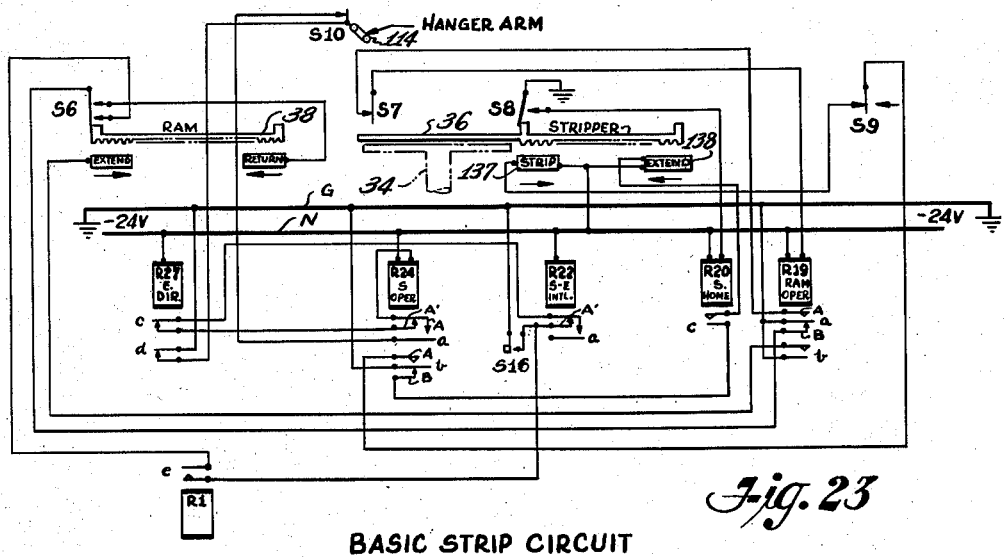
Fig. 23  BASIC STRIP CIRCUIT
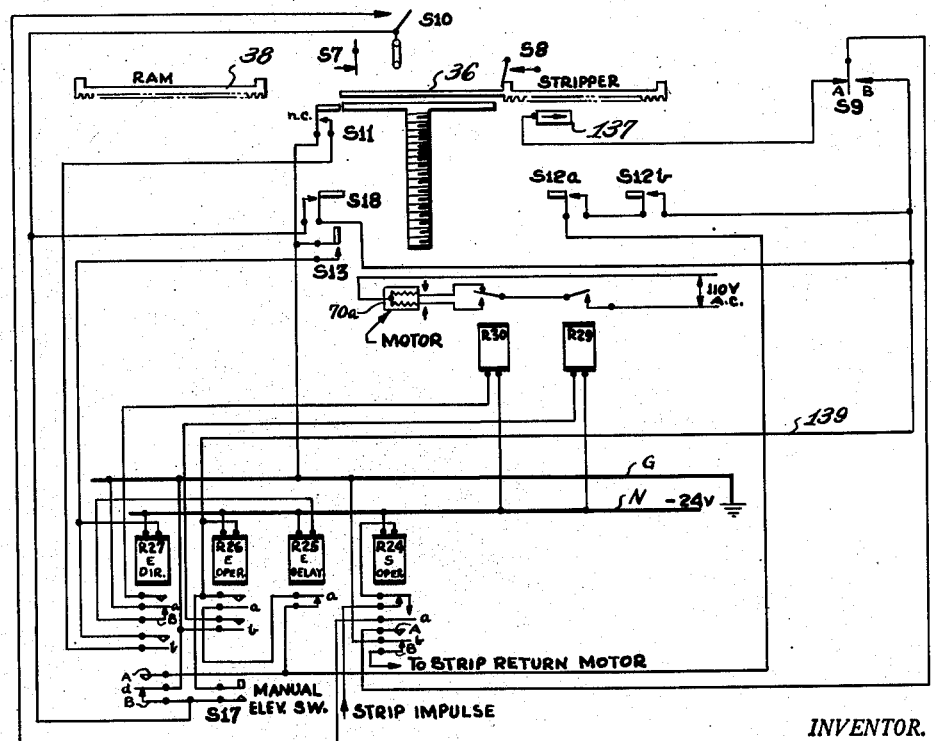
Fig. 24  BASIC ELEVATOR CIRCUIT March 31, 1953     J. K. BRUCE     2,633,251
PALLETIZER Filed Feb. 2, 1948     10 Sheets-Sheet 8

INVENTOR.
JOHN K. BRUCE
BY Harold W. Mattingly
Attorney

Patented Mar. 31, 1953

2,633,251

UNITED STATES PATENT OFFICE 2,633,251

PALLETIZER

John K. Bruce, South Pasadena, Calif., assignor to Production Aids, Inc., North Hollywood, Calif., a corporation of California Application February 2, 1948, Serial No. 5,850

24 Claims. (Cl. 214—6)

My invention relates to a machine for automatically loading containers on pallets preparatory to shipment or storage. These machines are generally referred to in the industry as palletizers.

Present-day material handling is based upon the use of pallets which are portable platforms having a size approximately four feet by four feet. The pallets generally employ an open framework construction so that the tines of lift trucks may be inserted in the pallets to lift and move the pallets, together with their loads, which loads may be four feet to six feet in height. Alternatively, the pallets may be provided with skids that provide the necessary elevation of the load-supporting surface so that handling equipment may engage the pallet. Pallets are used to receive cartons or boxes from factory packaging lines, are used for moving these cartons to the carrier or warehouse, are used for supporting the boxes during transportation or storage, and are also used for delivery of the goods to the bulk consumer.

Heretofore pallet loading has been performed by hand labor. While various semi-automatic machines have been built and marketed for bricks and similar products, there has been no successful machine developed for pallet loading. Pallet loading therefore has been expensive and uniformity of stacking has been lacking.

My invention provides a completely automatic machine for loading pallets. Empty pallets may be fed into one end of the machine, and cartons or boxes fed in from the side, and loaded pallets may be delivered out the other end. Not only does my palletizer accurately layer and stack the cartons and boxes, but in addition arranges non-cubic boxes in any selected pattern so that the boxes of different layers will interlock or overlap and provide a stable and rigid stack on the pallet.

In general my palletizer employs a hopper or magazine for receiving a number of empty pallets. At the proper interval, a pallet is automatically removed from the bottom of the magazine, and a conveyor chain takes it to an elevator which in turn lifts it to a position just underneath a sliding loading deck. Cartons are fed into the machine along one edge of the loading deck, and when a row of cartons has been collected, a ram automatically shoves them onto the deck. Successive rows are thus deposited in parallel array until a complete layer for the pallet is obtained. The sliding deck is then pulled out from under the boxes, depositing them on the pallet. Because of this stripping action, the sliding deck may appropriately be called a stripper plate.

As soon as the stripper plate is retracted, the elevator automatically lowers to dispose the tops of the boxes just below the level of the stripper plate, whereupon the elevator stops and the stripper plate returns. The ram may then slide onto the plate a row of cartons that may have collected in the meantime. This cycle continues until a sufficient number of layers are deposited one on top of the other, at which time the elevator automatically lowers all the way to deposit the fully loaded pallet on a conveyor chain that delivers it to a staging area, where it may be handled by tine trucks or other material handling equipment.

An important part of my invention is the utilization or supplying of a turntable for automatically rotating certain of the boxes so that the boxes will form any pre-selected layer pattern. Thus as the containers are individually delivered by a conveyor to the palletizer, a selective turntable rotates certain of the boxes, preferably through a 90° turn. These boxes collect alongside the stripper plate as mentioned, and when a row has been assembled, the ram slides them onto the stripper plate. Thus when rectangular containers are used, the turntable permits the boxes of one layer to overlap those of another layer to securely bind the stack together. Also, the turntable is independently useful in arranging the boxes of a single layer so that they properly fit upon the pallet.

From the foregoing outline of my palletizer it will be obvious that the interrelation of parts must be carefully controlled as to function, timing, and sequence. This control is performed in accordance with my invention by an electrical system which may employ relays and switches as the principal functional elements. Further, the entire electrical system is constructed so that it may be actuated by the arrival of incoming containers at a selected station. Thus the containers themselves actually trigger or time the system rather than being elements which must be fitted into an overall master pattern that is continuously operating. Further, the electrical system employs a counting array or chain or other device that is stepped off one unit or link at a time by the arrival of each box or container.

It will be obvious from the foregoing outline of my invention that the principal object is the provision of an automatic palletizer of great versatility and flexibility as to size and shape of containers being loaded on pallets as well as flexibility and variety in the building of stacking patterns.

Another object is to provide a palletizer wherein pallets and cartons may be supplied to the machine, and which in turn automatically delivers pallets that are fully stacked with the cartons.

Another object of my invention is to provide a palletizer that employs a turntable so that any desired layer pattern may be achieved for the cartons that are to be loaded on a pallet.

Another object of my invention is to provide an automatic palletizer including a turntable for orienting containers and also including a control circuit so that the containers and successive layers on the pallet will be differently arranged so as to give interlocking stacking arrangements.

A further object is to provide a palletizer utilizing an elevator for the pallets so that a pallet may be lowered as it is successively stacked with layers of containers received at a station of constant elevation.

A further object of my invention is to provide a layer forming station for a palletizer machine in the form of a stripper plate permitting the deposit at one time of a complete layer of cartons upon a pallet without disturbing the preceding layer on the pallet.

Still a further object of my invention is to provide a palletizer wherein containers are collected in rows on a loading platform and are removed therefrom a complete row at a time by means of a ram.

Another object of my invention is to provide a palletizer control system that is triggered by each container as it arrives at the palletizer.

Another object is the provision of a palletizer control system that determines the sequence of operations of the palletizer and which is based on a counting array, chain, stepping switch or other device of sufficient length to respond once for each box in a pallet layer.

Another object is the provision of a palletizer control system including several phases or sequences so that the arrangement of containers from one layer to the next on a pallet may be varied.

Yet another object is to provide an electrical control circuit for a palletizer wherein there are interlocks between various controls to stop a succeeding operation during, or upon the malfunctioning of, a prior operation.

There are numerous other objects, advantages, and features of my invention, but in the interest of brevity these will be presented and disclosed in the following description, considered together with the accompanying drawings forming an integral part of this specification, and in which:

Fig. 1 is a perspective view, with portions broken away, of a palletizer machine incorporating the principal elements of my invention;

Fig. 2 is an end view of the pallet magazine of the machine of Fig. 1, but with the end plate removed as well as the chain sprocket;

Fig. 3 is a side view of a portion of the pallet magazine operating mechanism as indicated by the lines III—III of Fig. 2;

Fig. 4 is a fragmentary view corresponding to a portion of Fig. 2 but illustrating the magazine in a pallet releasing condition;

Fig. 5 is a schematic side view of the machine with the side plate removed illustrating a loaded pallet being fully lowered by the elevator and a fresh pallet being dropped for transmission to the elevator;

Fig. 6 is a view corresponding to Fig. 5 wherein the fresh pallet has been completely elevated by the elevator and the stack of pallets is supported in its usual manner;

Fig. 7 is a fragmentary perspective view of the palletizer of Fig. 1 illustrating the stripper plate as fully extended over the elevator well so that it is ready to receive a fresh layer of containers;

Fig. 8 is a view corresponding to Fig. 7 illustrating the stripper plate as partially loaded and illustrating a container being turned on the turntable;

Figure 11:
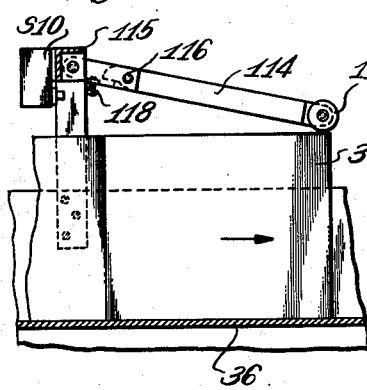
Figure 12:
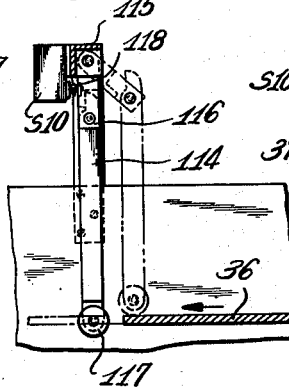
Figure 13:
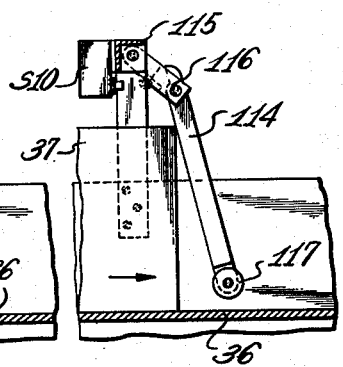
Figure 18:
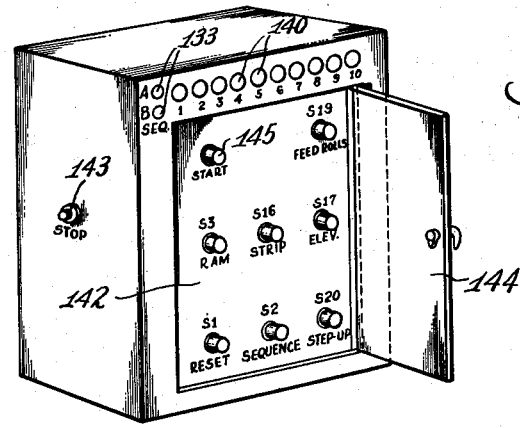
Figure 14:
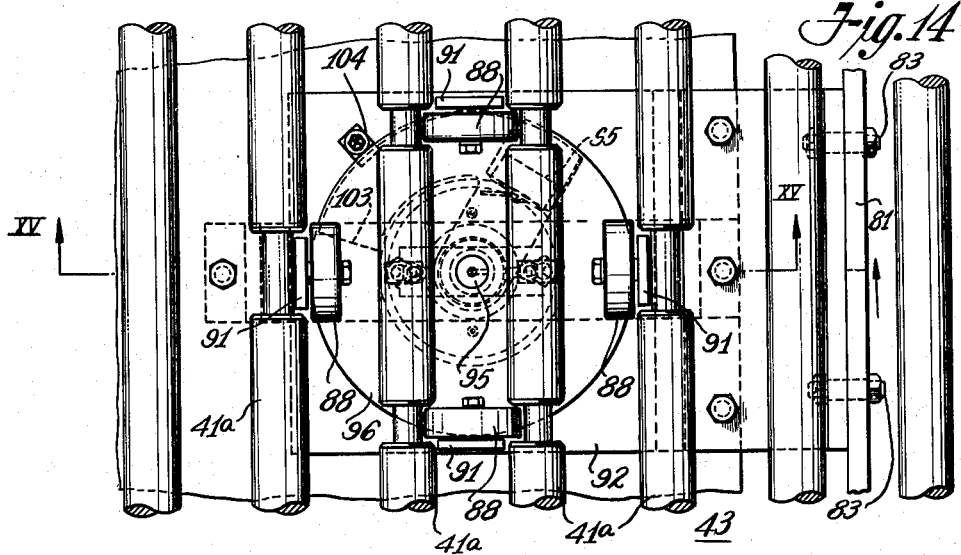
Figure 15:
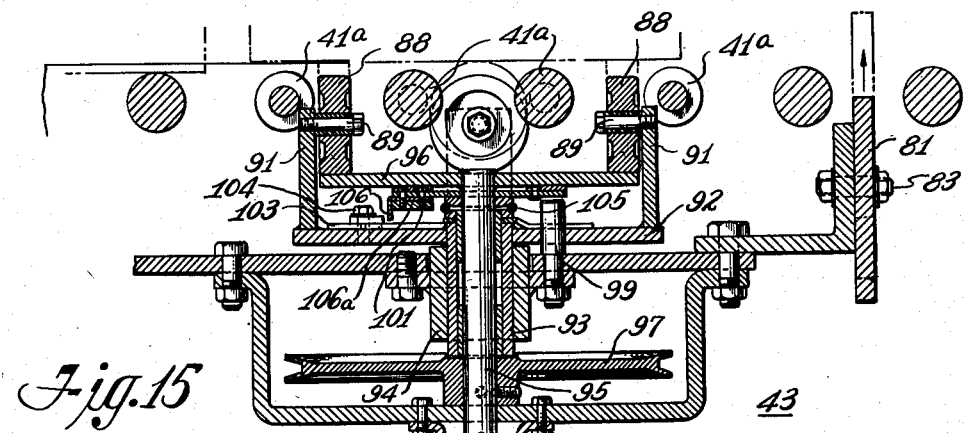
Figure 16:
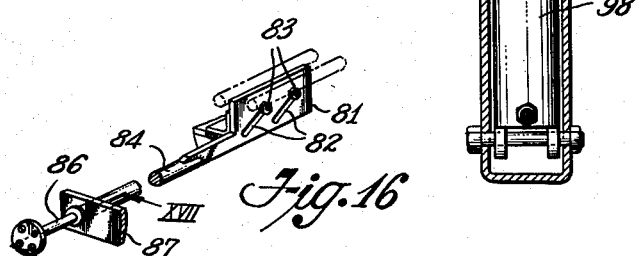
Figure 17:
Figure 21:
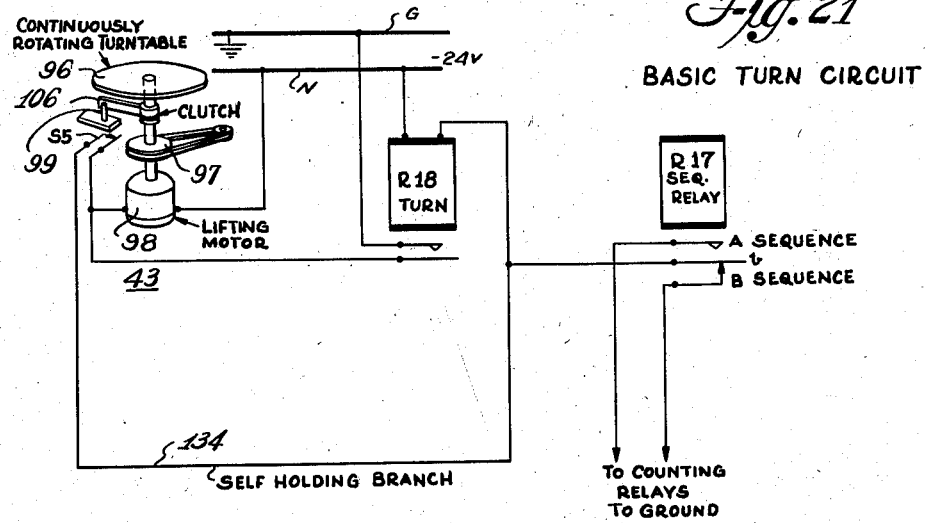
Figure 22:
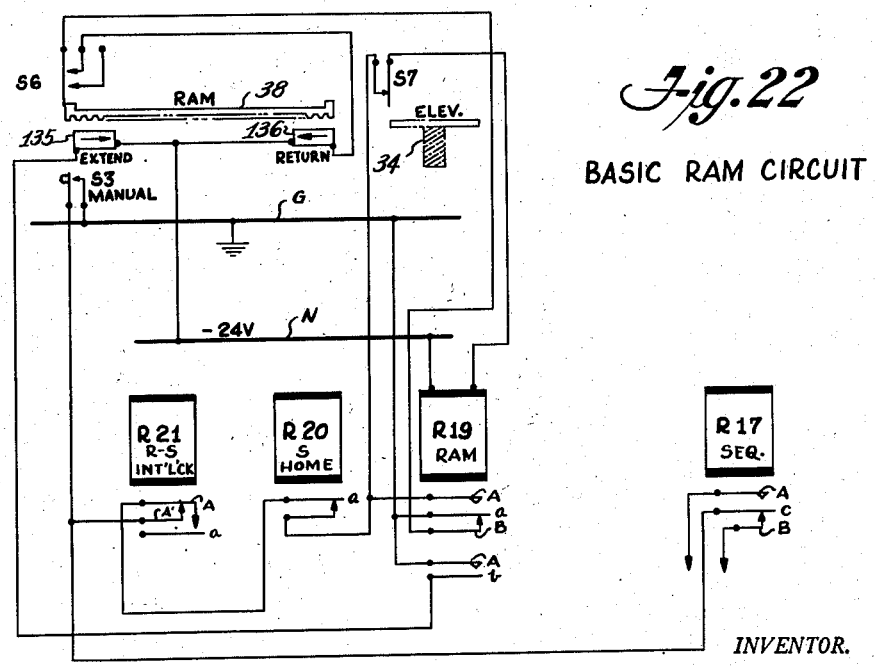
Figure 25:
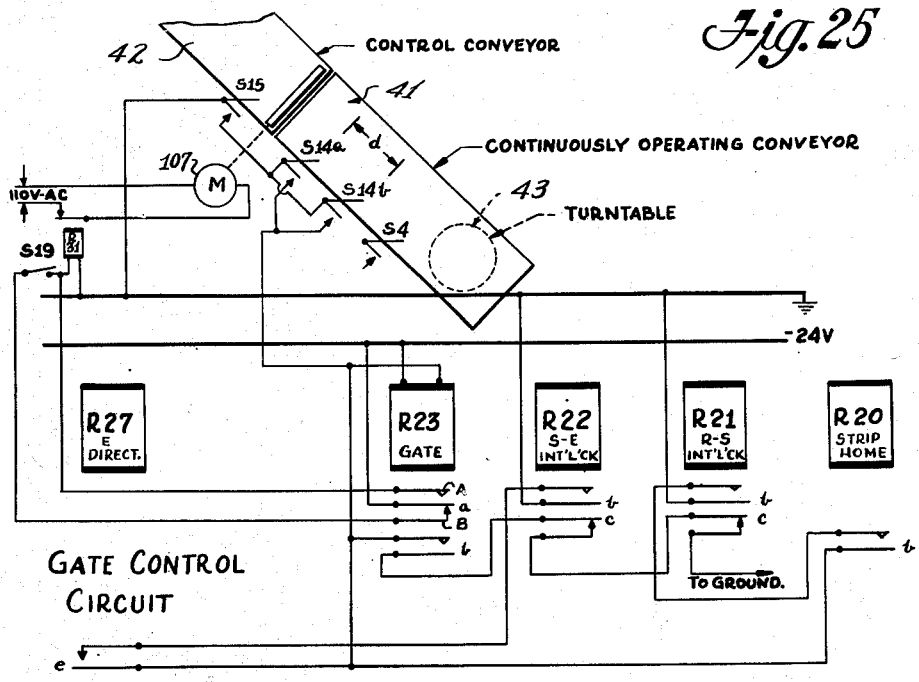
Figure 26:
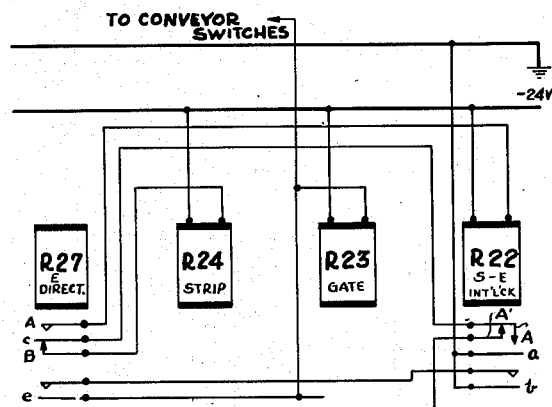
Figure 27:
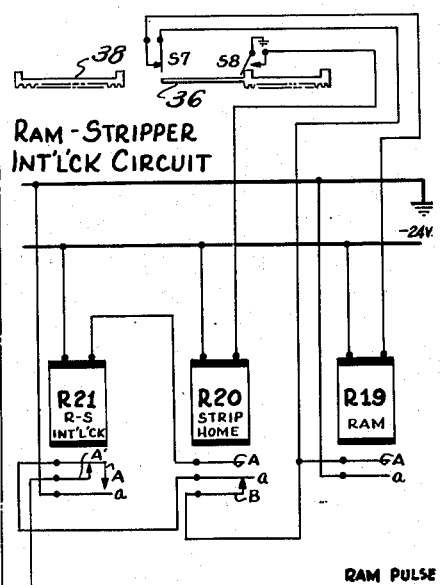

Figs. 11, 12, and 13 are elevation views of the various positions of the hanger arms above the stripper plate as a layer is fully positioned, after the layer has been stripped and lowered and the stripper plate returned, and as a fresh layer is being pushed onto the stripper plate;

Fig. 14 is a top view on an enlarged scale of the turntable of Fig. 1;

Fig. 15 is a sectional view taken along the line XV—XV of Fig. 14;

Fig. 16 is a perspective view, with portions broken away, of a conveyor gate that restrains packages when the ram is operating;

Fig. 17 is an enlarged fragmentary sectional view of the gate of Fig. 16 as taken between the lines XVII—XVII of that figure;

Fig. 18 (Sheet 3) is a perspective view of a control panel for use on the palletizer of Fig. 1;

Fig. 19 is a ram turn diagram illustrating the ram and turn functions as related to the units of a counting chain;

Fig. 20 is a circuit diagram illustrating the operation of the counting chain of a pulsing mechanism and a sequence mechanism;

Fig. 21 is a wiring diagram of the basic circuit for operating the turntable;

Fig. 22 is a wiring diagram of the basic circuit for operating the ram;

Fig. 23 is a wiring diagram of the basic circuit for operating the stripper plate;

Fig. 24 is a wiring diagram of the basic circuit for operating the elevator;

Fig. 25 is a wiring diagram of the basic circuit for operating the exterior conveyor or gate of the palletizer;

Fig. 26 is a wiring diagram of the interlock circuit between the stripper plate and the elevator controls;

Fig. 27 is a wiring diagram of the interlock circuit extending between the ram and the stripper plate controls; and Fig. 28 is a complete wiring diagram for the entire palletizer, of which the diagrams of Figs. 19 to 27, inclusive, are parts.

Mechanical description

Referring to Fig. 1, the entire palletizer machine may be referred to by the numeral 30, which machine may include a pallet magazine section 31 in which pallets 32 may be stored, and may include a conveyor chain assembly 33 for feeding the pallets to an elevator mechanism 34. The elevator 34 will normally suspend a pallet 32 below a stripper plate 36, upon which containers 37 may be shoved by a ram assembly 38 after the cartons are collected in a row upon a loading platform 39. The loading platform 39 may be the terminal section of a continuously operating conveyor assembly 41 which receives containers from a control conveyor 42. A turntable assembly 43 may be located in the continuously operating conveyor 41 just adjacent to the loading platform 39.

The mechanism for operating the pallet magazine 31 may be best described with reference to Figs. 1 to 6, inclusive. This mechanism is actuated mechanically by the elevator reaching its lowermost position. The elevator 34 may include a pair of rotatable screws 35, each having a threaded engagement with an elevator slide 44. Each elevator slide may be provided with a projection 45 (Figs. 2 and 4) carrying a pin 46, which pins are adapted to fit into a pivoted yoke 47 forming the driving element of a magazine operating mechanism generally referred to by the reference numeral 48. Each yoke 47 may be coupled by a crank 49, a link 51, and a crank 52 to an arm shaft 53 supported at intervals along the length of the base of the machine by channels 54. These shafts 53 accordingly extend from the region of the elevator 34 rearwardly to the pallet magazine 31, at which points a pair of arms 55 are formed on each shaft interconnected by bars 56. The normal positions of the arms 55 are illustrated in Fig. 2, whereat a stack of pallets 32 is supported by the bars 56.

When, however, the elevator slides 44 descend to the bottom extreme of their travel, their pins 46 will engage the yokes 47, rotating the arms 55 to a generally horizontal position as illustrated in Fig. 4. The bars 56 no longer support the pallets 32, and accordingly they may drop downwardly upon a pair of conveyor chains 57 sliding in channels 58 supported upon the U-shaped brackets 54. The chains in turn are passed around a rear sprocket 59 and a forward sprocket 61 (Figs. 5 and 6).

Only the bottom pallet 32 of the stack drops on the chains 57, however, due to the fact that the remainder of the stack of pallets is restrained from downward movement by a toggle mechanism illustrated best in Figs. 1 and 3. The toggle mechanism in turn may be powered by a lever 61a having a driving connection to the shaft 53 by means of a crank 62 and a length of chain 63. The lever 61a may engage a toggle operator 64 connected at its upper end to a pair of toggle arms 65 which in turn are connected to cranks 66 mounted on a pair of transverse shafts 67. A plurality of plates 68 may be welded or otherwise secured to each transverse shaft 67 so that when the toggle is straight, as illustrated in full lines in Fig. 3, these plates will rotate from a depending position to a generally horizontal position to engage the upper surface of the next to the last pallet in the stack. The rotation of the shafts 67 may be brought about by means of a counterweight 60, and the shafts are maintained in their locked operational position by means of the straight position of the toggle arms 65, as illustrated in Fig. 3. Thus, as illustrated in Figs. 4 and 5, the pallet stack is being supported by the plates 68 while the bottommost pallet is dropped, and when this pallet is carried forward to the elevator and the elevator again rises, the arms 55 will return to their upright position to support the stack of pallets. Simultaneously with the rotation of the arms, the plates 68 will reassume their depending normal positions.

Figure 9:
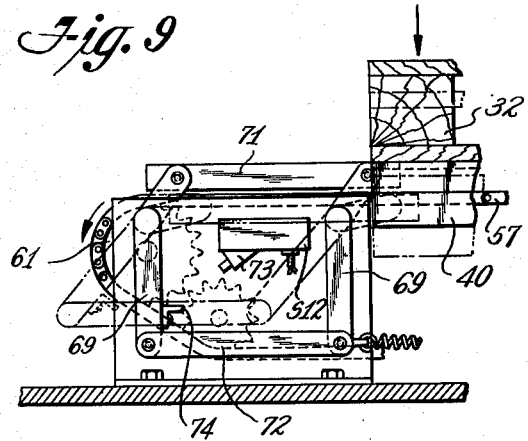
Fig. 9 is an elevation view from an opposite hand with respect to Fig. 1 of a switch located at the end of a pallet delivery chain and illustrating the switch in an inoperative position occurring when a fully loaded pallet descends in the elevator.
Figure 10:
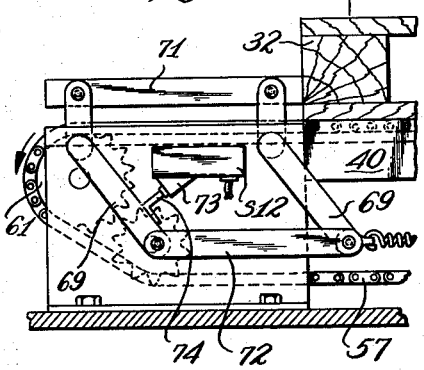
Fig. 10 is a view corresponding to Fig. 9 but illustrating the actuation of the switch by a fresh pallet being positioned in the elevator and illustrating the positioning function of the switch mechanism.

The pallet that is released and which is carried forward by the continuously operating chains 57 must be stopped at the appropriate position along the chains, where it will be centered with respect to the elevator slides 44 so that it may be elevated. This centering mechanism is illustrated in Figs. 9 and 10, wherein each chain conveyor is provided with a pair of pivoted bell cranks 69 connected by top and bottom bars 71 and 72. As the pallet is carried along the chains (to the right in Fig. 1 and to the left in Figs. 9 and 10), the top bar 71 of each pair of bell cranks will be contacted by the pallet and accordingly the cranks will be rotated to the position illustrated in Fig. 10. The rotational movement will be halted, however, by means of a stop 73 that may be engaged by a projection 74 on one of the cranks. As will be brought out later in the description of the circuits, the stops 73 incorporate switches S12a and S12b which both must be closed before an impulse is given to cause the elevator to rise. Thus the stops 73 for the bell cranks 69 act as both mechanical and electrical devices for centering a pallet 32 in the elevator slides 44.

Each slide 44 of the elevator may be provided with a longitudinally extending angle 40 (Figs. 1 and 4) that is adapted to fit just outside each channel 58 in which the chain 57 rides. Therefore when the elevator slides 44 are at the bottom of their well, the angles 40 will be disposed just underneath the newly positioned pallet resting in the elevator well. The elevator will lift the new pallet to a position just below the stripper plate 36 as illustrated in Fig. 6. The stripper plate in turn will receive packages that accumulate on the loading platform 39, which accumulation is best illustrated in Fig. 8. When a complete row of containers 37 has been assembled on the loading platform, the ram 38 is operated to force them onto the stripper plate 36. The ram may include a ram plate 76 (Figs. 1, 7, and 8) which may be connected to a pair of racks 77 driven in turn by spur gears 78 mounted on a rotatable shaft 79 journaled in the side walls of the palletizer. The shaft 79 may be operated by an individual electric motor, or may receive power from a central mechanical drive system engageable by means of reversible clutch mechanisms. The ram plate 76 accordingly may be moved over the loading platform 39, shoving the containers off of the conveyor rollers of the platform with an endwise movement with respect to the rollers.

It will be appreciated that complications might arise if the conveyor 41 fed packages to the palletizer while the ram was in operation. Accordingly as illustrated in Figs. 14 through 17, I provide a conveyor gate 81 which may be in the form of a plate having diagonal slots 82 therein. This plate may be positioned as indicated by the reference numeral 81 in Fig. 1. Stationary bolts 83 may pass through each slot so that when the plate 81 is moved to the right, the plate will be raised. The plate may be moved by means of a stem 84 that is continually urged toward the right (Fig. 16) by a compression spring 85 disposed within the stem 84 and contacted on its other end by a plunger 86. The stem 84 may have a bracket 87 connected thereto for contact by the ram plate 76. Accordingly, when the ram is in its retracted position, the rear end of the ram plate will contact the bracket 87, compressing the spring 85 to pull the gate plate 81 to a retracted position below the rollers. When, however, the ram moves forward upon operation, the spring will be released and its compression will urge the plate 81 forwardly, causing it to rise. It will then be contacted by any containers that are delivered by the conveyor 41, and the containers will thus be stopped short of the ram.

The turntable 43 is provided particularly in accordance with my invention, and the detailed construction of one preferred form is illustrated in Figs. 14 and 15. The rotating elements of the turntable 43 may be in the form of four wheels 88 disposed between rollers 41a of the conveyor 41. These rollers may be continuously rotating, for example by a continuous chain contacting sprockets disposed on one end of the rollers. The wheels 88 may be mounted upon shafts 89 which in turn project from ears 91 secured to a horizontal plate 92 connected to a tubular shaft 93 mounted for sliding within a bushing 94. A drive shaft 95 may pass through the tubular shaft 93 and may have a rotatable plate 96 connected to its upper end that is disposed within the confines of the ears 91 and which is adapted to engage the bottommost portion of the wheels 88. A pulley 97 may have a driving engagement with the central shaft 95, and in turn may be driven by a suitable belt or other drive connected to a prime mover such as an electric motor. Thus the plate 96 may be rotated by the pulley 97 and in turn cause the wheels 88 to rotate.

It will be noted particularly with respect to Fig. 15 that the upper surfaces of the wheels 88 are normally disposed below the tops of the rollers 41a so that packages may normally pass along the conveyor 41 without interruption. If, however, the entire plate 92 is lifted, the wheels 88 will be lifted above the tops of the rollers 41a, and if a container is centered over these wheels, the container will be rotated. The lifting may be performed by lifting the central drive shaft 95 by means of a motor 98. This in turn lifts the plate 92 because of the bearing of the tubular member 93 against the pulley 97. The motor 98 may be of any type adapted for a short lift of an inch or less, and while I have successfully utilized a hydraulic cylinder for this purpose, I prefer at present to use a solenoid or other form of electric motor. The plate 92 is prevented from rotating because of a pin 99 passing upwardly through an aperture therein.

The turntable 43 also includes a mechanism for automatically stopping its operation; that is, for controlling the lifting motor 98. This mechanism may be of any desired type, but I have selected a friction clutch 101 as a suitable device for operating a switch S5, both disposed between the stationary plate 92 and the rotatable plate 96. Accordingly the switch S5 may be mounted on a crescent-shaped sector plate 103, the circular adjustment of which may be effected by means of a clamp screw 104. The friction clutch 101 may be urged upwardly against the bottom surface of the rotatable plate 96 by means of a garter spring 105. Further, the clutch may include a projecting finger 106 adapted to contact the switch S5, and may also include a block 106a adapted to contact the pin 99 during the unenergized condition of the turntable. For purposes of clarity of illustration, the finger 106 is shown in an intermediate position instead of in abutment against the post as would ordinarily be the condition.

Therefore as the plate 96 rotates, the friction clutch 101 rotates therewith until the finger block 106a strikes the post 99, and thereafter the clutch slips. When, however, the lifting motor 98 is energized, the plate 96 is lifted sufficiently above the post 99 so that the finger block 106a will clear the post and rotation of the finger will bring it into contact with the switch S5 which may, for example, be a microswitch, causing it to operate the switch which in turn deenergizes the motor 98 by a circuit illustrated in Fig. 21 and which will be described later, and the turntable drops.

The control conveyor 42 (Fig. 1) is adapted to receive packages from an assembly line as noted before, which assembly line preferably employs a gravity feed section just prior to delivery of containers to the conveyor 42. This permits control of the supply of containers to the palletizer by the conveyor section 42, since a power drive of the main conveyor might override the control conveyor 42. The conveyor 42 preferably employs a plurality of rollers 102 which may be of any desired construction, for example standard ball bearing mounted rollers which are all driven by any suitable mechanism such as a continuous chain engaging sprockets disposed on one end of all of the rollers. The chain or other driving device may be energized by a motor 107 which may be supported by a depending framework 108.

As previously mentioned, the control conveyor 42 operates in conjunction with the continuously operating conveyor 41 to stop the flow of containers to the palletizer when they arrive faster than the palletizer can consume them. This control function may be obtained by a plurality of feeler switches, one of which may be located on the control conveyor as S15, and two of which may be located on the continuously moving conveyor 41 as S14a and S14b. The switches S14 are preferably disposed apart at a dimension equivalent to the length of a container so that if a container is closing the switches S14 and a succeeding package strikes a switch S15, the control conveyor 42 will be stopped. The switches S14 and S15 may be suitably connected, for example by a series-parallel circuit as illustrated in Fig. 25, so that S14a or S14b and S15 must be operated to effect the control function of stopping conveyor 42. A fourth feeler switch S4 may be the last one in the group with regard to the direction of travel of the packages, and may act as the principal control switch for the entire palletizer.

The stripper plate 36 may be operated in any suitable manner, for example by the same rack and gear mechanism employed by the ram 38, which rack and gear mechanism is illustrated diagrammatically in Figs. 5 and 6. Each side of the stripper plate 36 may be provided with a downwardly-toothed rack 109 engaged by gears 111, which gears may be mounted on a common shaft. The shaft may be driven by an individual reversible electric motor or may be connected by reversing clutches and gearing to a single mechanical drive for the palletizer.

As noted particularly in Figs. 1 and 7, a pair of tracks are provided for the stripper plate 36, a lower track 112 on each side serving for the retraction guiding path, and an upper track 113 on each side serving for the return path. Appropriate rollers may be provided for the forward end of the stripper plate 36 so that it will follow the tracks with a minimum of friction. The elevated return tracks 113 are provided so that the returning stripper plate will be elevated several inches above the tops of the cartons of the preceding layer, and in the event that there are any loose flaps on the containers or incompletely glued flaps, these will not be torn loose but instead will be flattened against the container when the stripper plate reaches its final position over the loading well after dropping from the top tracks 113.

The mechanism for determining the length of elevator movement downwardly is provided particularly in accordance with my invention, and includes a pair of hanger arms 114 illustrated generally in Fig. 1 and in detail in Figs. 11, 12, and 13. Spaced above the normal position of the stripper plate 36 and spanning the well within which the elevator rides may be a bar 115 to which may be secured a pair of switches S10 opposite the hanger arms 114. The hanger arms may include an upper short link 116 as well as a roller 117 mounted on the lower end. Therefore, as illustrated in Fig. 11, an incoming package will swing the hanger arm 114 upwardly in which position the switch S10 is not actuated. However, when the stripper plate has been retracted and the elevator begins to lower, the hanger arm 114 resting upon the cartons 37 will follow these cartons down due to gravity acting on the hanger arm at its pivot to the cross bar 115. When the containers are below the position of the stripper plate 36, the hanger arm 114 will be in a straight-down position illustrated in Fig. 12, at which point an adjustment screw 118 will strike the switch S10, actuating it. The elevator will cease its downward movement by a suitable circuit connection such as that of Fig. 23, and thereafter the stripper plate 36 will return to its position over the elevator well. The returning stripper plate, as illustrated in Fig. 12, will strike the bottom end of the hanger arm 114, and the hanger arm will thereafter ride on top of the stripper plate. The next layer of packages will push the hanger arm 114 upwardly again, as illustrated in Fig. 13. Thus it is obvious that the hanger arms 114 provide a follow-up type of mechanism for the elevator switch control, which mechanism operates independently of the size of containers being processed by the palletizer. Furthermore, the jointed arm mechanism is foolproof and extremely reliable.

The general power requirements for the entire palletizer may be suitably met by the use of a number of individually controlled electric motors. However, a common source of power may be provided for most of the elements of the palletizer, with the drives being made by selective clutches where intermittent operation is desired. The chain drive 33 may be continuously operating at all times as well as the conveyor 41. The ram 38 and the stripper plate 36 are, of course, intermittently operated, and in addition the retracted stripper plate must remain in its retracted position until the elevator lowers. The control conveyor 42, as mentioned, may have a separate source of power, inasmuch as it is intermittently operated. The elevator screws 35 may each be journaled in a thrust and gear box 70, and may be driven by a single electric motor 70a (Figs. 5 and 6). As mentioned previously, the pallet release mechanism is powered by the elevator slides 44. A pair of conveyors 119 may be used to carry away the loaded pallets, and these conveyors need not necessarily be driven.

Mechanical operation

Referring to Fig. 1, containers of any desired type may be supplied to the control conveyor 42. While these containers are preferably in the form of closed cartons of wood or paper, they may also be open-top wooden boxes such as are used for bottled products, or may be sacks of material such as cement, potatoes, etc. For purposes of illustration, containers in the form of closed cardboard boxes are used. These containers 37 are preferably rectangular in form so as to bring out the interlocking layer feature of my invention, and accordingly the containers may be fed lengthwise down the control conveyor 42. The containers successively actuate the switches S15, S14a, S14b, and S4 to pass over the turntable 43 and onto the loading platform 39. In this connection it should be noted that the conveyor 41 is continuously operating, including the loading platform section 39. The containers travel over the conveyor 41 to the end of the loading platform 39, whereupon they strike the side wall of the palletizer and stop. When a row of containers has been collected on the loading platform 39 as determined by the counting impulses received by the control circuit from switch S4, the ram 38 then operates.

The stripper plate 36 is normally positioned over the elevator well as illustrated in Figs. 5, 6, and 7. Therefore when the ram operates, it pushes an entire row of containers onto the nearest edge of the stripper plate. The ram operates by engagement of the gears 78 with the racks 77 when the drive shaft 79 is rotated. During the ramming operation, the gate 81 (Figs. 14 to 17) is automatically raised due to the release of the compression spring 85 by the ram plate 76 (Fig. 1) moving forward and releasing its contact with the projecting ear 87 on the ram plate stem. The raising action takes place due to the mounting of the plate 81 with screws 83 passing through the inclined slots 82 in the plate. When the ram returns to its rest position, the ram plate 76 again contacts the bracket 87, retracting the gate plate 81.

A second row of containers is then permitted to pass onto the loading platform 39. If desired, the entire row, or certain boxes in the row, may be rotated 90° so as to obtain any desired pattern. Turning is effected by operation of the turntable lift motor 98, which lifts the rotating drive shaft 95 together with its drive pulley 97 which bears against the tubular shaft 93 to lift the non-rotatable plate 92. Therefore the turning wheels 88 are elevated above the tops of the conveyor rollers 41a and thus engage a container to lift it off of the rollers. The plate 96 being continuously rotating, imparts a rotary motion to the wheels 88, causing them to rotate the container being lifted.

The amount of rotation is determined by the position of the stop pin 99 relative to the control switch S5 as acted upon by a friction clutch finger 106. Lifting of the plates 92 and 96 also lifts the friction clutch 101, permitting the finger block 106a to pass over the top of the restraining pin 99. The frictional engagement with the continuously rotating plate 96 carries the finger 106 in a rotary movement until it contacts switch S5. This switch in turn deenergizes the lifting motor 98, causing the plates 92 and 96 to lower, thereby stopping the turning function of the turntable 43.

In the event that containers are supplied to the control conveyor 42 faster than the palletizer can handle the containers, the flow of containers will be automatically stopped by stopping the control conveyor 42. This conveyor control is effected by the feeler switches S15, S14a, and S14b. If a container is on the continuous operating conveyor 41 in such a position as to actuate switches S14a or S14b, it is obviously too close to the control conveyor 42 to permit a second container to be moved directly on top of it, particularly during the turning function where the container remains non-conveyed for the duration of the turning action. Therefore a successive container close enough to operate switch S15 will close a circuit that will stop the control conveyor 42 by stopping its driving motor 107. The preceding container will move along the conveyor 41, however, since it is continuously moving, and when switch S4 is operated, the control conveyor 42 will again become energized, supplying another container to the conveyor 41. Thus a mere release of either S14a or S14b will not initiate the motion of the control conveyor 42, although the circuits could be set up in this fashion if it were desired to obtain a more speedy operation. In this fashion the containers being run onto the continuously moving conveyor 41 are automatically spaced to not only give a proper time of operation for the turntable, but also to provide an interruption of operation of the control switch S4 which in effect must feel or count individual containers rather than have a long single operation as would occur if two containers were passing end-to-end.

The container in its rotated condition will then proceed down the conveyor 41 to the loading platform 39, where it will abut against the preceding container, assuming that it is not the first one in that row. While I have shown in the drawings complete rows being turned, it will be obvious that individual containers in one row may be rotated if desired.

A second row of containers having been assembled on the loading platform 39, the ram 38 will again be operated, forcing this row onto the stripper plate 36. The second row will also contact the first row, shoving this first row towards the middle of the stripper plate. Successive rows will be accumulated on the loading platform 39 and will be rammed therefrom until the entire stripper plate is completely filled.

When the stripper plate is completely filled, the stripper plate will automatically strip out from under the containers as pre-determined by the counting chain that is stepped off by contact of the containers with the feeler switch S4. With reference to Figs. 1, 5, 6, and 7, the stripper plate will move towards the right in a stripping action and the cartons assembled thereon will abut against an end wall 50. The cartons will then be pulled together by the stripping action, and as the plate slips out from under them, they will drop downwardly one or two inches until they strike either the pallet below or the preceding layer of cartons. The stripper plate will remain retracted and the elevator 34 will then begin to lower. This lowering action is effected by the motor 70a (Figs. 5 and 6) operating upon the gear boxes 70 to rotate the elevator screws 35 upon which the elevator slides 44 are threaded. The slides 44 will then lower, carrying with them the pallet and the cartons loaded thereon. The hanger arms (Figs. 11, 12, and 13) will follow the tops of the cartons downwardly, and when the hanger arms are straight down, the switch S10 will be actuated, causing the elevator to stop. The length of the hanger arms 114 is such that the stripper plate 36 may then safely return without striking the cartons, and when it is fully returned, as illustrated in Fig. 7, the stripper plate is then again ready to receive additional rows of containers. These containers in the meantime may have collected on the loading platform 39 while the elevator was lowering so that immediately upon full return of the stripper plate, the appropriate interlock circuit may be released to permit the ram 38 to shove the cartons endwise off of the rollers of the loading platform onto the stripper plate.

When a sufficient stack of cartons has been formed layer by layer on a pallet, the elevator will be at a low enough position to strike a keep-alive switch that will continue the downward movement of the elevator until it strikes the bottom of its travel. In so dropping, it deposits the loaded pallet on the pair of chains 57 which are continuously moving and the loaded pallet is carried out of the palletizer onto the standby conveyors 119 (Fig. 1).

The last part of the downward movement of the elevator slides 44 also energizes the pallet magazine release mechanism to cause a fresh pallet to be dropped upon the chains 57 so that it may be carried forward to the elevator well in position for elevation just below the stripper plate. The lugs 45, together with their pins 46 on the elevator slides 44, contact their respective yokes 47, causing the shafts 53 to be rotated, in turn causing the support bars 56 (Figs. 2 and 4) to be rotated to a lower position. Simultaneously the arm 62 acting through the chain 63 permits the lever 61a to fall, causing a straightening of the toggle arms 65 as illustrated in Fig. 3, particularly under the influence of the counterbalance weight 60. This causes the shafts 67 to rotate so that their plates 68 are positioned between the stringers of a pallet as illustrated in Fig. 3. In this connection it should be noted that the plates 68 are interposed for their support action prior to the dropping of the pallet stack so that little or no load is imposed on the shafts 67 until after the toggle is locked as illustrated in Fig. 3. When the support bars 56 drop below the level of the chain 57, the lowermost pallet is accordingly supported by the chains and is carried forward to the elevator. It is thereupon engaged by the angles on each elevator slide 44 and lifted to the position illustrated in Fig. 6 just below the stripper plate 36. The lifting of the elevator slides 44 drives the yokes 47 in opposite directions, not only driving the support bars 56 to their support position shown in Fig. 2, but also forcibly pulling the crank 62, together with the chain 63 and the lever 61, to break the toggle to release the remainder of the stack of pallets so that it may again rest upon the bars 56.

The fresh pallet being moved forwardly to the elevator on the chains 57 is halted by means of the stop and switch mechanism illustrated in Figs. 9 and 10. Accordingly the fresh pallet strikes the upper bar 71, rotating the cranks 69 counterclockwise as viewed in those figures, and causing the bracket 74 on one of them to strike the stop 73. At the same time a switch S12 associated with each stop is actuated, and by having the switches in series on each chain, the pallet will be straightened before it will be lifted by the elevator.

Conversely, the stop mechanism is not energized when a loaded pallet descends in the elevator because the end of the top bar 71 projects over the downward path of the pallet and accordingly is contacted by the pallet to rotate the cranks to the position illustrated in broken outline in Fig. 9. The chains thus may move the loaded pallet off of the ends without hindrance from the stop mechanism.

*Ram and turn operations*

As mentioned previously, my control circuit, together with the turntable, permits the building of pallet stacks that are interlocked. The interlocking is achieved by having the containers of one layer in a different pattern from those of the preceding layer so that the containers overlap one another to bind the stack together. Each layer is formed of rows which in turn are formed by the ram, and the turning of complete rows or individual packages in a row forms the overlapping. Accordingly, therefore, the locking stacking arrangement is a function primarily of the ram and turntable.

Referring to Fig. 19, there is illustrated a layer A and a layer B, each having a different geometric arrangement but each containing the same number of cartons or containers. This particular arrangement of two layers is for illustrative purposes only, inasmuch as it is the simplest explanation of my invention as contrasted to layers of different numbers and layers wherein only certain containers of one row are rotated rather than the whole row. With reference to layer A, it will be noted that cartons 1 to 4, inclusive, have been rotated 90°, assuming that the ram function takes place from the bottom of each layer as shown, and that the packages are fed in from the left-hand side of each layer as shown, as is the case with the palletizer machine of Fig. 1. Therefore the uppermost row of four cartons of layer A includes the cartons that were first assembled on the loading platform 39. The second row including cartons 5, 6, and 7, was formed by having the containers pass over the turntable without interference. In this connection the containers illustrated have a dimension such that three times the length equals four times the width, a common container size used in industry. Likewise the third row of three cartons of layer A includes cartons that were not rotated. The numbering of the cartons from 1 to 10, inclusive, of each layer indicates the sequence in which they arrived at the palletizer.

As mentioned previously, my invention includes the use of a counting chain that has one link or unit responsive to each container in a layer. Inasmuch as the layers A and B include ten containers each, the counting chain is provided with ten links or units. While the counting chain could be in the form of a rotary stepping switch, I find it more convenient to use the old and well-known relay counting chain which has been used in the past in telephony dial systems. Accordingly I employ relays R1, R2, etc., up to R10, which relays may be successively actuated.

As mentioned previously, my control system is responsive to the receipt of individual containers at the palletizer, which receipt is transmitted by operation of the feeler switch S4. Accordingly, when a container strikes the feeler switch S4 (Fig. 1), it causes the operation of one of the relays of the counting chain. However, as will be described in connection with Fig. 20, the functional operations of the machine, including the operation of the ram and the operation of the turntable, are not effected until the container has passed switch S4 and released it. Therefore a container 37 striking switch S4 steps the counting chain one unit, and after passage past the switch, places the functional circuits in operation. It will be noted with reference to Fig. 1 that after a container has left switch S4, it will be practically in position over the turntable 43. Therefore if a turn operation is to be performed on that particular container, it will be substantially in position upon its release of switch S4, and appropriate contacts for its respective counting relay will energize the turntable to cause rotation of this container.

This operation of the turntable is in contrast to the operation of the ram since the ram is spaced farther from the switch S4 and in addition the container must travel to a position in front of the ram plate 76 before it may be operated upon by the ram. Since it is inconsistent with the turntable functioning of the present machine to cause a package to effect its own ramming, I have so devised my counting chain that a succeeding package causes operation of the ram for a row of cartons preceding the triggering carton or container. Therefore, in summary, a container may be rotated as it releases S4, but a container is rammed only by virtue of the succeeding container releasing switch S4.

Referring now to layer A in Fig. 19, it will be noted that the first four containers have been rotated. Therefore, referring to a diagram 123, of these containers as they are released from the switch S4, it will be noted that the first four counting relays must include contacts that will cause a turning operation to be performed. However, the remainder of the cartons in layer A are not rotated and accordingly containers 5 to 10, inclusive, pass through uninterruptedly. However, in order to ram the first four cartons off of the loading platform 39, the fifth container must operate the ram function for the preceding four, and accordingly the fifth container may be designated as a ram container. Likewise containers 5, 6, and 7 must be rammed by number 8 container. Further, when the counting chain has been completed and re-starts its sequence of ten, the first container must cause the ramming operation for containers 8, 9, and 10.

It will be obvious that if layer B is deposited on top of layer A, the containers will overlap one another, thus binding the stack securely together. This overlapping array of containers is illustrated clearly in Figs. 1 and 5 through 7. Thus by alternating layers A and B an interlocking stack may be arranged. It will be obvious, however, that if desired, three or more separate layer arrangements could be provided, but I have found in actual practice that two different layer arrangements are ample to bind together most pallet loads.

Considering now layer B, it will be noted that the first row of containers 1 to 3, inclusive, are not turned, and accordingly in their associated diagram 124 no turn function is indicated. The same is true of containers 4, 5, and 6. However, the last four containers are rotated, and diagram 124 indicates that these are turned. Further, the first row of three containers must be rammed by the fourth container passing switch S4, and the second row must be rammed by the seventh container passing switch S4. When all containers have passed switch S4 and the counting chain returned to one, number one container of the next layer will, of course, ram the preceding four, and accordingly container 1 must be designated as a ram container.

Combining the diagrams 123 and 124 of layers A and B and adding together the ram and turn operations, it will be noted that if a single counting chain is to be used for both layers, then R1 must include both a ram contact and a turn contact. Relays R2 and R3, however, need contain only turn contacts, since there is no ramming or turning in either layer A or layer B for these counting units. By adding together the fourth container of layer A and layer B, it will be noted that both a ram and turn operation must be effected, and accordingly relay R4 must have ram contacts as well as turn contacts. Counting unit 5 need only have ram contacts, since only ramming occurs, whereas in counting unit 6 no ram or turn contacts are provided since these operations do not occur for this container in either layer. R7 must be provided with ram and turn contacts to accommodate layer B, whereas ram and turn contacts for R8 are necessitated by combining layers A and B. R9 and R10 include only turn contacts.

Having combined the operations for forming two separate and distinct layers into one counting chain, it is obvious that these ram and turn functions must be separated out as to whether layer A is being made, or as to whether layer B is being formed. It will be obvious that the problem could be avoided by having separate sets of contacts for each layer, but this would add undue complexity to the system. Accordingly when the ram and turn contacts are being operated to produce layer A, they may be said to be operating in sequence A, whereas where they are being operated to produce layer B, they may be said to be operating in sequence B. Therefore a sequence relay R17 may be provided so that the ram and turn contacts may be selectively operated in either sequence A or sequence B. As illustrated, R17 has a rest position so as to give rise to sequence B (to produce layer B). When sequence relay R17 is energized, its armatures c and b will be pulled upwardly by electromagnetic force and thereby engage the A contacts to give rise to sequence A which in turn produces layer A.

It will be noted with reference to the ram turn diagram that the counting relay R1 must ram on both sequence A and sequence B. Accordingly the ram contact of R1 may be connected directly to armature c of R17. However, the ram contacts for R4 apply to sequence B only, and accordingly the ram contact for R4 is connected to contact B of R17 c armature. The ram operation for R5 refers to sequence A, and accordingly the ram contact is connected to contact A of c of R17. The ram operation for R7 refers to sequence B, and accordingly is connected to B contact. The ram operation for R8 refers to sequence A, and accordingly is connected to contact A.

Considering now the turn contacts, it will be noted that the turn operation of R1 relates to sequence A, and accordingly its turn contact is connected to contact A of b armature of R17. The same is true of counting relays R2, R3, and R4. There is no turn operation for R5 and R6 on either sequence A or sequence B. It will be noted with reference to the B sequence ram turn diagram that there is a turn operation for R7, R8, R9, and R10, and accordingly the turn contacts for these counting relays are connected to the B contact of b armature of R17 so as to give a B sequence operation.

In summarizing the content of Fig. 19, therefore, it will be noted that the ten cartons of either layer A or layer B are directly related one by one to ten relays of the counting chain; that is, the relays R1 to R10, inclusive. Further, the ram and turn operations for each container of both layers are combined insofar as the actual ram and turn contacts are constructed on the counting relays. These combined contacts are separated as to sequence by the sequence relay R17. In the rest position of R17, sequence B will be connected for operation to thereby give a layer constructed as layer B. However, when the sequence relay R17 is energized, its armatures c and b will be drawn upwardly so as to connect the ram and turn contacts into the A sequence, which will give a layer pattern in accordance with layer A.

The turn armatures of R1 to R10, inclusive, of Fig. 19 appear on Fig. 28 as the third armature, excepting R5 and R6 which do not have turn armatures. Since the armatures are identifiable best by letters, these turn armatures are the "c" armatures, lettering them alphabetically starting with the lowermost as "a"; that is, the armature next to the relay coil. The ram armatures appear as follows: R1–d; R4–d; R5–c; R7–d; and R8–d.

*Counting, pulse, and sequence circuits*

The circuit for operating the counting relays R1 to R10, inclusive, is illustrated in Fig. 20, together with a circuit including pulsing relays R15 and R16 for generating a pulse of current to be supplied to the functional relays, and this figure also shows a circuit for alternatively energizing the sequence relay R17 from one layer to the next. As mentioned previously, the counting chain is old and well-known in the art, particularly in the telephony art, and as such need not be described in detail. However, to assist with an understanding of the invention, particularly for those not skilled in the counting circuit art, a brief description will be given of the counting circuit. Fig. 20, like all the other circuit diagrams, illustrates the various switches, relay armatures, and relay contacts in their rest position. Initially, it should be noted that the counting circuit may have associated with it three or more operating relays identifiable in Fig. 20 as R12, R13, and R14, the numeral 11 being omitted from this specification with regard to identifying a relay. The energizing pulse for the counting circuit is obtained from the feeler switch S4 located on the continuously operating conveyor 41 as described in connection with Fig. 1. When a container strikes S4, its blade will be deflected to the B contact, thus applying a ground potential to that contact inasmuch as the blade is grounded as indicated. In this connection it will be noted that the complete counting chain is energized by a battery 125 which is representative of any source of D. C. current. Further, it will be noted that the positive terminal of this battery is grounded so that a negative potential will be applied to the counting chain. Therefore when switch S4 closes a circuit to ground, current will be supplied from the battery to the counting chain.

The closing of S4 on B contact applies ground to the normally closed armature b of R12. Throughout this specification, a "normally closed" contact will be indicated as N. C. Current is passed through b armature of R12 to N. C. b armature of R13, thence to N. C. b armature of R14, and thence to the ground connection of R1. This passes current through R1, causing it to become energized and pulling its armatures a and b downwardly. Closing of the R1 armatures on their contacts passes ground potential through armature a to one side of R14. However, the other side of R14 is also connected to ground through a of R13, and thence through b of R10. Therefore there is no immediate effect on R14 due to a of R1 closing. The closing of b of R1 merely connects the A contact of b of R14 to the ground side of R2, but since no current is supplied to A contact of R14, nothing happens. Energizing R1, however, will close additional contacts such as the ram and turn contacts illustrated in R19 to effect functional operations.

When a container passes S4, its blade will normally return to its A contact, and a circuit will be operated as will be described later. However, the breaking of the circuit with B contact of S4 breaks one connection to ground for R1, causing it to ground itself through its armature a, through R14, through a of R13, and b of R10. This circuit not only constitutes a self-holding circuit for R1, but the current passing through R1 also passes through R14, energizing that relay and causing its b armature to engage contact A which is now connected through b of R1 to R2. Thus passage of a package past S4 causes R1 to become self-holding through R14 to energize R14.

The next container striking S4 will establish a ground connection through N. C. b of R12, b of R13, thence through A contact of b of R14, thence through b of R1 to energize R2. Thus R1 and R2 are energized at the same time, while the blade of S4 is on contact B. R2 establishes a self-holding circuit through its a armature and R13 while its b armature connects a circuit to energize R3. When, however, the container passes S4 and the blade leaves contact B, the self-holding circuit through R13 will energize R13, and its a armature will pull down, thus breaking the circuit to ground for R14. R14 accordingly will drop out and the self-holding circuit for R1 is simultaneously interrupted at a of R13, and R1 will drop out. Thus R2 will be the only counting relay energized, and R13 will also be energized.

The next container striking S4 will pass current through N. C. b of R12, thence through b armature of R13 which is now on A contact, thence through b armature of R2 to energize R3, and R3 will lock in. Thus momentarily R3 and R2 will be energized. R3 will close a circuit to energize R4, and its a armature will close a self-holding circuit through R12. Thus when the container leaves S4, R3 will nevertheless remain energized due to a circuit to ground through its a armature, R12, a of R14, and b of R10. Energizing R12 however, will cause its a armature to break the circuit for R13, and hence also for R2, and R2 will fall out.

The fourth package will cause S4 to send a pulse through b of R12, thence through its A contact to b of R3 to energize R4. R4 in turn is connected similarly as R1, and will establish a self-holding circuit through R14 to repeat the cycle. Thus when the fourth package drops off of S4, R14 will be energized, knocking out R12 at its a armature, and the cycle is completely re-established. Thus it will be seen that the container striking S4 will lock in the next succeeding counting relay, and when the container leaves S4, the preceding counting relay will drop out. This sequence of operations continues until R10 is energized, whereupon its b armature will break the circuit to ground for all of the operating relays R12, 13 and 14, and thence will stop the counting and place the complete counting circuit in condition to start again on R1.

I prefer to operate some of the functional relays (that is, ram and turn relays) by a pulse of current that is generated after the package has passed S4, so that only the desired counting relay will then be locked in. The use of a pulse of current gives rise to a certainty of operation as compared to operating the relays by the counting pulse, inasmuch as containers may close S4 for varying periods of time. Also, the use of a separate operational pulse avoids the complications inherent in the counting chain when two counting relays are momentarily energized together.

The pulse is generated in accordance with my invention by utilizing two relays R15 and R16. In this connection it will be noted that these relays are selectively placed across a pair of supply busses or conductors including a ground wire G and a negative potential wire N which, for example, may be at =24 v., assuming that 24 v. relays will be utilized. This supply for the busses G and N may be from the same battery 125 used for the counting circuit, or may be an independent supply.

When a box has passed S4, S4 will return to its A contact, applying ground through A' contact of R16 to energize R15. R15 is of a type that is slow to operate as well as slow to release. Thus there may be a delay of .05 second for operation after S4 closes on A. This delay permits the preceding counting relay to drop out fully, as well as allowing for the mechanical inertia of its contacts in returning to their normal positions. The delay is also correlated to the space between S4 and the turntable 43 on conveyor 41, and also correlated to the speed of the conveyor so that the container that released S4 will then be squarely over the turntable and will be in position for a turning operation if that particular counting relay which it triggered closes a turntable circuit. R15 will then become energized, and its a armature will pass ground to R16, energizing R16. The a armature of R16 will break the circuit at A', deenergizing R15, but R15 will not drop out immediately because it is slow to release, and may, for example, take .25 second to drop out. The a armature of R16 will establish a self-holding circuit for R16 through its A contact and S4. Thus R16 will remain energized as long as S4 is in its normal position on contact A.

A pulse of D. C. current will be generated, the duration of which is determined by the length of time that it takes for R16 to operate. The pulse duration therefore is dependent upon the time that it takes R16 to operate its armatures. In this connection R16 is a slow to operate relay, and may, for example, have a delay time of .10 second. Therefore the pulse duration will equal the operating time of R16 of .10 second. This pulse is of sufficient duration to actuate in a very positive manner any of the ram and turn relays that are pulsed in this manner, as these quick acting relays operate generally in .005 to .010 second.

The pulse may be conveyed from a armature of R15 through b and c armatures of R16 and thence to a turn pulse bus 126 connected to the B contact of a of R16. A ram pulse bus 127 may be connected to the contact of armature c of R16, which is also connected to a of R15. The pulse carrying the busses 126 and 127 may be connected to the armature of the ram and turn contacts of the counting relays R1 to R10, inclusive, thus supplying the connection that is missing for these armatures on Fig. 19.

While the turn bus 126 may be connected directly to the turn armatures of the counting relays, if desired the ram bus may pass through the operating relays R13 and R14 for the counting circuit. This may provide an additional safety factor, and accordingly the d armature of R14 may be connected to 127 as illustrated in Fig. 28B. R14 will be energized on count numbers 1, 4, 7, and 10, of which the first three only include ram functions, and accordingly the contact for this d armature may be connected to the ram armatures for these respective counting relays. Likewise R13 will be energized when counting relays R2, 5, and 8 are operated, and accordingly the contact of its d armature will be to these relays, except R2, wherein no ram function occurs.

The sequence operation of Fig. 20 is effected primarily by R17 as previously noted, and secondarily by ratchet relay 28. Ratchet relay 28 has one side tied to bus N, and the other side passes through switch S2, which is normally closed, down to the c armature of R14. Thence it travels through the c armatures of R13 and R12 to ground. Therefore R28 will be energized only when R12, R13, and R14 are deenergized, since their C contacts are normally closed. These three counter-operating relays will be deenergized only at the completion of a counting run. This is due to the fact that the b armature of R10, the last relay in the counting chain, breaks the circuit for energizing any of these three operating relays. Therefore when the tenth box is counted off by the chain, R12, R13, and R14 will all be deenergized for the first time during the counting run, energizing R28.

R28 is a ratchet-type relay which may include a ratchet armature 128, a ratchet wheel 129, and a petal wheel 131 which actuates a switch blade 132. The number of petals on the wheel 131 is preferably one-half that of the ratchet teeth on the wheel 129. Therefore one operation of R28 will cause the switch blade 132 to open the switch to R17, whereas the next operation of R28 will permit the switch blade 132 to fall into contact, closing the circuit to R17. Therefore, since ratchet relay R28 is operated at the end of each counting run, it will cause R17 to be alternately energized, thus alternating sequence A with sequence B. The manual switch S2 may be manually operated to change the sequence by breaking the circuit to ground through R12, 13, and 14. The next operation of the counting chain, however, will shunt the switch due to b armature of R15 closing.

A visual indication of the particular sequence being operated may be obtained from a pair of lights 133 designated A and B according to the sequence, and connected one each to the two contacts of a armature of R17. Sequence B is normally in effect when R17 is deenergized, as previously noted with respect to Fig. 19.

In summarizing the circuit of Fig. 20, switch S4 being contacted by a box so that its blade strikes contact B causes stepping of the counting chain of R1 to R10, inclusive, the succeeding relay being locked in at the same time the preceding relay is locked in. However, when the container falls off of S4, the preceding relay will drop out. The return of the blade of S4 to its A contact operates the pulsing relays R15 and 16 to apply a pulse of D. C. to the turn pulse bus 126 and the ram pulse bus 127. These conductors are connected to the armatures of the ram and turn contacts of Fig. 19 so that operation of the counting relays completes the circuit from these conductors 126 and 127 to the sequence relay contacts R17. The sequence relay R17 is operated by the ratchet relay R28, which is energized only when all of the operating relays R12, 13, and 14 drop out as R10 is operated. The manual switch S2 changes the sequence by holding out R28 when R10 is operated. The entire counting chain may be returned to starting position by operation of the manual switch S1, which has the same effect as R10 being operated.

A conductor 130 may connect the a armatures of R12, R13, and R14 to ground through N. C. b armature of R16. Thus a ground circuit is supplied for the operating relays when R10 has been energized and the counting chain is returned to R1.

*Turntable circuit and operation*

Illustrated in Fig. 21 is a schematic showing of the turntable 43, together with a circuit for operating the turntable. The turntable structure has been described in detail in connection with Figs. 14 and 15, including the continuously rotating pulley 97 which continuously rotates a plate 96, and the switch actuating finger 106 is friction clutch connected to the rotating mechanism. The pin 99 normally stops the finger 106 from rotating.

Considering now the circuit, a turn pulse of current will be received by either contact A or contact B of the b armature of R17, the sequence relay. As described in connection with Fig. 19, the turn function is controlled by the counting relays 1 to 10, inclusive, and the turn pulse is metered by the pulsing relays R15 and R16. Thus ground is selectively applied according to counting relay number on the contacts A and B of R17. This ground connection passes through armature b of R17 to energize R18, the turn relay. The armature of R18 accordingly engages its contact, closing a circuit from the bus N through the lifting motor 98, through the relay armature to bus G. Thus the continuously rotating turntable 96 will be lifted and the turning function will take place.

A branch conductor 134 may be connected also to the b armature of R17 to establish a self-holding circuit for R18, which circuit passes through S5 and through the armature of R18 to ground. Thus the short duration pulse from R15 will energize the relay, and thereafter the relay will establish its own self-holding circuit so that it remains locked in long after the energizing pulse has ceased.

The lifting motor 98 not only lifts the turntable 96, but also lifts the finger 106 away from the restraining pin 99. Accordingly the finger 106 will rotate through approximately 90° until it strikes the blade of switch S5, opening switch S5. This opens the self-holding circuit for R18 through conductor 134, and since the pulse from R15 will long since have passed, R18 will be deenergized and its armature will open. This breaks the circuit for the lifting motor 98, and the turntable 96 will drop downwardly, thus stopping the turning operation.

From the foregoing it will be obvious that the turntable operation is more or less self-contained in that it automatically cuts itself off by opening the self-holding circuit at S5.

Basic ram circuit and operation

Illustrated in Fig. 22 is the basic ram circuit, including relays R17, 19, 20, and 21, of which R19 is the principal ram relay. Relays R20 and R21 are safety or interlock relays so that the ram function will not occur when the palletizer is not prepared for ramming a row of containers.

As described in connection with Fig. 19, the ram circuit is closed at each counting relays 1 to 10, inclusive, so that a pulse of current may be transmitted through the ram contacts of these counting relays from the pulsing relays R15 and R16. These ramming impulses are delivered to contact A or contact B of the c armature of R17, depending upon whether an A sequence or a B sequence is being operated. The ram impulse thus received will pass from armature c to contact A' of R21, thence to the a armature of R20, thence through switch S7 to the ground terminal of R19 to energize R19.

Armature b of R19 will then close on its contact which is connected to ground to pass ground to a ram extend motor 135, causing the ram to be actuated. The ram will thereupon perform its ramming function until it reaches the end of its stroke; that is, it moves to the right in Fig. 22. Energizing R19 also causes its grounded a armature to engage its A contact, which establishes a self-holding circuit for R19 through S7. Thus R19 remains locked in regardless of the duration of the original ram pulse.

When the ram 38 reaches the end of its ram stroke it will open switch S7, interrupting the self-holding circuit through a armature, and R19 will open. Armature a will then engage its contact B, which passes ground through a switch S6 which will now be closed, and in turn will pass ground to a return motor 136 to return the ram. When the ram has returned to its normal rest position it will cause switch S6 to be opened, thereby stopping the return action. In this connection the closing of S7 will have no effect since no ram pulse will pass through this switch until the next circuit is closed by the counting chain.

As mentioned previously, the ram operating motors 135 and 136 may be merely reversing switches on a reversible electric motor for the ram. Alternatively, they could represent two unidirectional motors or electrically operated clutch mechanisms engaging a mechanical drive. A manual switch S3 may connect the ram pulse circuit to ground so that the entire palletizer may be manually rammed as desired. The function of relays R20 and R21 will be described in connection with the interlock circuit of Fig. 27.

Basic strip circuit and operation

The basic strip circuit is illustrated in Fig. 23, which includes the ram operate relay R19, the stripper home position relay R20, the stripper-elevator interlock relay R22, the strip operate relay R24, and the elevator direction relay R27. The strip operation is primarily controlled by R24, and when this relay is energized a circuit extends from the ground bus G through its b armature to its A contact, thence through a switch S9 to a strip motor 137. When the stripper plate 36 has reached the end of its stripping stroke, it will mechanically open switch S9, stopping the stripping action. The stripper will then remain stationary in a retracted position until the elevator has lowered sufficiently so that the stripped layer of packages will be below the rest position of the stripper plate. Thereafter the stripper plate will return.

The stripper plate 36 is actuated every time the counting chain returns to R1, since there will then be a complete layer of cartons on the stripper plate. In this connection it will be recalled that the counting chain is triggered by a container striking S4, and when a container triggers the counting chain back to R1, this box then becomes the first box in the next layer. Accordingly R1 may be provided with a set of strip contacts including an armature e and a contact which it engages when R1 is energized.

There are several conditions to fulfill in the stripping action. The first of these is that the stripping shall not take place until the ram has completed its last ramming stroke for that particular layer. In order to save time, the stripper plate is preferably operated upon the completion of the forward stroke of the ram and before the ram returns to its rest position. The second factor in operating the stripper plate is that it must be retained in its retracted position until the elevator has lowered the stripped layer of containers a sufficient amount to permit the stripper plate to be returned above the stripped layer and thereby be ready for a new layer of cartons.

Considering now the first condition, namely operation of the stripper plate after the ramming has been completed, it will be remembered that ramming occurs on R1, and since the strip armature e is also on R1, these two circuits will be closed simultaneously at R1. Accordingly the strip circuit must pass through switches or relays responsive to the position control of the ram 38, and accordingly the e armature of R1 closes a circuit to ground through S6 when the ram has started its forward motion, and thence through the B contact of a armature of R19 to ground. In this connection it will be remembered that when ramming takes place, R19 will be in its energized state and a armature will engage its A contact. Therefore a armature will not drop to its B contact until the ramming stroke has been completed.

The contact of e armature of R1 completes the circuit for energizing R24 and passes through A' contact of R22, thence through c armature of R27, thence through A' contact of R24 to energize R24 by connecting its ground terminal to ground. R24 is thereupon energized and its a armature breaks the circuit at A', transferring the circuit through R24 to its A contact, thence through armature a, through the hanger switch S10, and thence through d armature of R27 to ground. Thus the locking in of R24 passes from the control of R1 to the control of the hanger switch S10. Thus packages for the next layer may continue to accumulate on the loading platform 39 (Fig. 1) without affecting the operation of the stripper plate when they step off the counting chain. At the same time armature b engages contact A to operate the strip motor 137 as described to cause the stripping action to take place.

When the stripper plate has begun its retraction, it will permit a home positioner switch S8 to close, thereby energizing the home position relay R20. This relay will then close a circuit for the B contact of b armature of R24, extending to a stripper plate return motor 138. Thus when the elevator has lowered a sufficient amount so as to open switch S10, the self-holding circuit for R24 will be interrupted and R24 will drop out. Its b armature will then drop to its B contact, passing ground to the return motor 138 through c of R20. The stripper plate 36 will then return until the last part of its movement opens switch S8. This causes R20 to drop out, breaking the return motor circuit at its armature c.

In summary of the operation of the strip circuit of Fig. 23, it will be realized that the strip and ram circuits are closed at the same time at R21, but that stripping cannot take place until a ram has completed its ramming stroke. Accordingly a circuit through e armature of R1 goes through the contacts of R19 which are in proper position to complete the circuit only after R19 has dropped out, which occurs when its self-holding circuit is interrupted by the ram opening switch S7 at the end of the ram stroke. Thus no stripping circuit is completed until the ram has completed its forward stroke. The circuit from the contact of R1 goes through the stripper elevator interlock R22 and through the elevator direction relay R27, since stripping should occur only when the elevator 34 is in condition to lower and not to raise. The stripping relay R24 is then energized through its A' contact. The b armature of R24 passes current to the strip motor 137, and the stripper plate 36 retracts until it opens S9, stopping strip motor 137. R24, however, remains energized because it is controlled at this point by S10. When S10 opens, R24 drops out and a circuit is established through b armature of R24, through its B contact, to the return motor 138. A manual switch S16 may be provided to pass around to R24 ground terminal to manually effect stripping.

*Basic elevator circuit and operation*

The basic elevator circuit is illustrated in Fig. 24, including the strip operation relay R24, an elevator delay relay R25, an elevator operated relay R26, and the elevator direction relay R27. As previously mentioned, all switches and relay contacts are shown in their rest position. However, it should be noted that R25 is normally energized inasmuch as ground current is applied from bus G through a armature of R27, thence through its B contact to the ground terminal of R25. Therefore a self-holding circuit through the armature of R25 is normaly open when R27 is in its unenergized condition, which occurs when the elevator is moving downwardly.

The basic control signal for the elevator on the lowering action is given by the stripper plate 36 when the stripper plate reaches its fully retracted position. When this fully retracted position is obtained, the stripper plate 36 will mechanically move the blade of switch S9 to its B contact. During the stripping action and while the stripper plate remains in its retracted position, R24 will be energized and its b armature will apply ground potential to the blade of S9. Therefore, when the blade engages its B contact, it will apply ground to a conductor 139 connected to this contact and having a branch to the ground terminal of R26. R26 will then operate and its armature b will engage its contact, thereby connecting a power relay R29 to ground. R29 will close, completing a power circuit to the elevator motor 70a which, for example, may be connected to a commercial electrical supply such as 110 v. A. C. or 220 v. A. C. No self-holding circuit is required for R26 on the lowering action, inasmuch as R26 is directly controlled by the stripper plate operating S9.

When R29 is in its unenergized condition, the motor direction causes the elevator to lower. Thus the elevator will lower until S10 is opened at the hanger arm. This switch opens the self-holding circuit for R24 through its armature a, and R24 becomes deenergized and its b armature falls off of contact A to energize the stripper return motor (Fig. 23) by engaging its contact B. The circuit to the blade of S9 is simultaneously broken at this armature b, and ground to conductor 139 is thus broken and R26 drops out. The b armature of R26 will then disengage its contact and R29 drops out, opening the power circuit to motor 70a, and the elevator stops. Therefore the amount of downward movement of the elevator is controlled by the switch S10 indirectly by deenergizing R24.

When a new layer of boxes has been placed on the stripper plate 36, these boxes will close S10 and stripping takes place when the counting chain again reaches R1. This cycle continues until the elevator has dropped a sufficient amount to strike a keep-alive switch S18, at which point the pallet will be fully loaded. The switch S18 acts to by-pass the hanger switch S10 insofar as the elevator operate relay R26 is concerned. But the opening of S10 will open the self-holding circuit for R24, causing R24 to drop out and causing the stripper plate to return over the well. However, the B contact of S9 will still be supplied with ground potential through S18, and the d armature of R27, and accordingly R26 will remain energized regardless of the opening of switches S10 and S9.

When the elevator with its loaded pallet reaches the bottom of the well, it will close a lower limit switch S13 which in turn will energize R27 by connecting it to ground. The d armature of R27 will break the circuit to ground for R26 by lifting off of its B contact, and R26 will fall out, causing R29 in turn to open the motor circuit. Thus the lowering action of the elevator is stopped by S13 once it has passed the control of S10.

The last movement of the elevator causes the loaded pallet to be deposited on the continuously moving chains 57, and it is taken away. The last downward movement of the loaded pallet also sets the mechanical linkage of Fig. 1 in motion to deposit a fresh pallet on the continuously moving chains 57.

The fresh pallet moves along the chains until it strikes the jointed stops (Figs. 9 and 10), actuating the switches S12a and S12b. These switches straighten the pallet if need be by having a series circuit through them, and since they are connected to ground through d armature of R27, they will apply ground to the conductor 139. This ground potential will be supplied to R26, and R26 is again operated, operating R29 which in turn supplies current to the elevator motor 70a. R26 will establish a self-holding circuit on the up-stroke, since R25 will now be deenergized and the self-holding circuit will extend through armature a of R26, the armature of R25, and thence to ground through d armature of R27 which now engages its A contact.

The direction of motor 70a will be reversed, however, due to the fact that a direction relay R30 is connected to the A contact of a armature of R27. Thus when R27 is energized and R26 is energized, the elevator will rise. The passing of the elevator past S18 on the up-stroke will have no effect because the conductors leading to it are not connected to a source of current.

The lifting of the elevator will cause S13 to open, but R27 will not be deenergized due to the fact that a self-holding circuit is established through its *b* armature to a normally closed switch S11, thence to ground.

When the elevator reaches the top of the well, it mechanically opens S11 and the current supplied through *b* armature of R27 is interrupted, breaking the self-holding circuit for R27. This relay then drops out, and since S12a, S12b, and S18 are now open, the return of *d* armature of R27 opens the self-holding circuit of R26, and the motor stops.

The elevator is now in position to start again the loading cycle, and when the stripper plate is completely filled with a layer of boxes, the number one box for the next layer will return the counting chain to R1, giving rise to a strip impulse which in turn causes lowering of the elevator.

As mentioned previously, R25 is the direction-responsive relay for completing a holding circuit for R26 on the up-stroke of the elevator, particularly since S12a and S12b open as soon as the elevator rises. No self-holding circuit is required on the down-stroke for R26 because of the stripper actuation of S9 as well as the keep-alive action of S18. From the standpoint of the direction responsiveness of R25, this function could be served by contacts on R27. This function, however, is reserved for the separate relay R25 because it is desirable to impose a delay in the establishment of the self-holding circuit when the elevator reaches the bottom of the well and R27 is energized. The purpose of having a slow to release relay (for example .20 second) that upon release will establish a self-holding circuit is to avoid any unintended jump-over due to any mechanical lag or inertia of the armatures of R26. Thus when the elevator reaches the bottom of its stroke, the *d* armature of R27 will snap to its A contact, thus passing ground through *a* armature of R25 to *a* armature of R26 to make R26 self-holding. If, however, R26 did not release in the interval that it took *d* armature of R27 to snap from one contact to the other, R26 would still remain energized and the elevator would immediately begin to rise upon striking the bottom switch S13. Thus the slow to release nature of R27 interposes a delay in establishing a self-holding circuit for R26, avoiding the possibility of R26 continuing its function due to establishment of the self-holding circuit.

A manual switch S17 may be placed between conductor 139 and the B contact of *d* armature of R27 so as to manually cause the elevator to move downwardly at any selected stage in the loading operation.

*Gate control circuit and operation*

Fig. 25 illustrates a circuit for operating the outer control conveyor 42. Inasmuch as the stopping of this control conveyor has the same effect as a mechanical gate, this circuit may be referred to as a gate circuit. Stopping the control conveyor 42 stops the flow of cartons or containers to the palletizer so that the cartons will be spaced as they pass S4 and the turntable 43, and is also utilized to stop the flow of cartons when the palletizer is momentarily stopped, for example by operation of an interlock circuit.

The main conveyor control or gate relay is a relay R23, and when it is operated its *a* armature engages its A contact to pass currrent to a power relay R31 controlling the flow of power to the conveyor motor 107. The motor 107 drives the rollers of the control conveyor 42 which is the outermost conveyor attached to the machine as a part of the palletizer machine. The inner conveyor 41 is continuously operating under all conditions, and extends clear across the palletizer so as to take containers to and past the turntable 43. The feeler switch S15 is disposed adjacent the inner end of this outermost conveyor, and is series connected to the feeler switches S14a and S14b situated on the continuously operating conveyor 41. The switches S14 are disposed apart a dimension *d* that is one carton-length so that a single carton will close both of the switches. Therefore if switches S14 are closed and the succeeding package engages S15, ground will be passed to R23, causing it to operate R31, thus stopping the outermost conveyor 42.

A separate holding circuit is established for R23 through its *b* armature engaging its contact, which circuit passes through the *c* armature of R22, thence to the *c* armature of R21, and thence through the normally closed contacts of R15 to ground. Thus if none of the interlock circuits are operated, that is the ram-strip interlock or the strip-elevator interlock, the circuit becomes self-holding until a container strikes S4 to step the counting circuit and thereafter operate R15. If, however, a more speedy operation were desired, the circuit could be controlled directly by S15 and S14a and S14b.

Two separate additional actuating circuits are provided for R23, one responsive to the strip-elevator interlock relay R22, and the other responsive to the ram-strip relays R20 and R21.

Considering now the strip-elevator interlock circuit, it will be noted that *e* armature of R27 is connected to the control conductor of R23 and hence if it establishes a circuit to ground, R23 will be operated. This circuit to ground may be established through *e* armature of R27, and *b* armature of R22 when R22 is actuated, which actuation occurs when a strip impulse is sent to the stripper plate when the elevator is on the up-strike. Thus container congestion is avoided during a stripper-elevator interlock period by operating R23.

The second actuating circuit for R23 takes place by closing a circuit to ground from *e* armature of R27 through R20 and R21, thus stopping the flow of containers in response to ram-stripper interlock actuation. Thus the control conductor of R23 is connected to *b* armature of R20, connected in turn to *b* armature of R22, and thence to ground. Thus if both R20 and R21 were actuated, which occurs when a ram impulse is received and the stripper plate is not in position, the flow of packages will be stopped, thus avoiding congestion during this interlock period.

It will be noted with reference to R22 that the actuation of R22 interrupts the normal holding circuit through its armature *c*. This would seem to be undesirable, but it should be noted that actuation of R22 establishes an actuation circuit through its *b* armature, thus taking over any function that might have been served by the self-holding circuit of *c* armature of R22. In addition, inasmuch as R21 and R22 are slow to release relays, R22 will hold the self-locking circuit of R23 open for a moment after the incorrect condition rights itself, thereby automatically dropping out R23 and thus starting conveyor 42, reestablishing normal flow conditions.

The control conveyor 42, that is the feed rolls, may be stopped by a manual switch S19 which passes current to the power relay R31 through the a armature of R23.

*Interlock relay circuits and operation*

Figs. 26 and 27 illustrate the basic relay interlock circuits. Fig. 26 showing the strip-elevator interlock circuit, and Fig. 27 showing the ram-strip interlock circuit. Various other interlock circuits have been presented in the foregoing circuit descriptions, but the present description will be of special interlock circuits employing separate interlock relays.

Relay R22 of Fig. 26 is the principal relay of the strip-elevator interlock which hereafter will be referred to as the S—E interlock. The purpose of the S—E interlock is to prevent the stripper plate from actuating when the elevator with its pallet is not in a proper position. Thus this interlock circuit avoids the dumping of a layer of containers down into the well. In this connection it should be noted that to speed the operation of the palletizer, containers are loaded on the stripper plate while the elevator is getting rid of a loaded pallet and while a fresh pallet is being lifted to position just below the stripper plate.

The S—E interlock is responsive to elevator direction which in turn is controlled by R27. Thus while the elevator is going down it is presumed that there will be no need for the S—E interlock because the time would be too short for completely loading the stripper plate. It is only after the elevator hits the bottom stop (S13) and R27 is thereby actuated that the interlock is capable of operating.

Assuming that a strip impulse is received while the elevator is on the up-stroke and R27 is thereby energized, the strip impulse passes through contact A' of R22 and instead of being delivered to the B contact of armature c of R27, it will be delivered to the A contact. This impulse will directly cause actuation of R22. A self-holding circuit for R22 is established through its a armature and through c armature of R27. Thus the strip impulse is not delivered to the strip relay R24, stripping does not take place, and the impulse instead actuates R22.

Relay R22 also performs a second function, namely the stopping of the flow of boxes to the palletizer by operating R23, the gate relay, as previously described in connection with Fig. 25. This is effected through the d armature of R27 which is connected to the control terminal of R23, and this armature will establish a circuit to ground through b armature of R22 when R22 is actuated. Thus the flow of packages will be stopped as described.

When the elevator reaches the top of its travel, it opens switch S11 (Fig. 24) and R27 is deenergized, and the c armature of this relay returns to its B contact, deenergizing R22. The operation of the gate relay R23 will have stopped the flow of containers, but this will not prevent the containers already on the moving conveyor 41 from passing S4 on the way to the loading platform 39 (Fig. 1). These containers accordingly will step the counting relays so that R2 and possibly R3 will be energized by the time the elevator has arrived at the top of its well. The stripper plate will then be ready for stripping, but inasmuch as its normal impulse is from R1, a secondary source of impulse must be received for the stripper relay R24.

This stripper impulse upon cessation of the interlock may be obtained from contact A and armature a before they disengage each other. For this purpose R22 may be a slow to release relay, for example .20 second, and R27 will thereby be given substantial time to return to its normal rest position before R22 is affected. Therefore when c armature of R27 has returned to its B contact, a armature of R22 will still engage its A contact, transmitting ground to R24 to operate R24. Since R24 is the strip operate relay, the stripper plate will then be operated and the palletizer will resume normal operation.

The ram strip interlock of Fig. 27 includes two interlock relays, namely R20 that is responsive to the stripper plate leaving its home position, and R21 which is responsive to a ram pulse when R20 is operated. The purpose of the ram strip interlock is to prevent packages from being rammed when the stripper plate is not in position, thus preventing dumping of packages down the well.

The ram pulse from R17 passes through contact A' of R21 to a armature of R20, thence through S7 to operate R19. If, however, the stripper plate is not completely in its home position over the well, S8 will be closed and will ground R20, actuating it. A stripper pulse will then be passed to the A contact of a armature of R20, energizing R21, which closes a holding circuit through its A contact and its a armature. Thus when a ram impulse is received and the stripper plate is not in its home position, the relay R20 diverts the ram impulse to actuate R21. Also the relays R20 and R21 stop the flow of containers to the palletizer as described in connection with Fig. 25, thus preventing congestion of the machine when the ram is stopped from its normal operation during this interlock period.

When the stripper plate has finally returned to its home position, it will mechanically open switch S8, causing R20 to drop out, and its a armature will interrupt the holding circuit for R21. Since the containers on the continuously moving conveyor 41 may have stepped the counting relays, it is desirable to independently apply a ram pulse so that the operation of the palletizer will not get out of synchronism with its counting relays. This ram energizing impulse is obtained from a armature of R21 due to the a armature engaging its A contact. In this connection relay R21 is also preferably a slow to release relay, for example having a .20 second release time, so that armature a of R20 will have ample time to rest on its contact B while R21 is still energized. Accordingly ground potential will be applied through a armature of R21, through its A contact to a armature of R20, through its B contact to S7, and thence to R19 to operate R19, the ram relay. Ramming will then take place and the control of the subsequent ramming actions will return to the counting chain which will now be in proper coordination with the containers since only one container can fit between the control switch S4 and the ram gate 81 (Fig. 1).

*General comments*

Figure 28A:
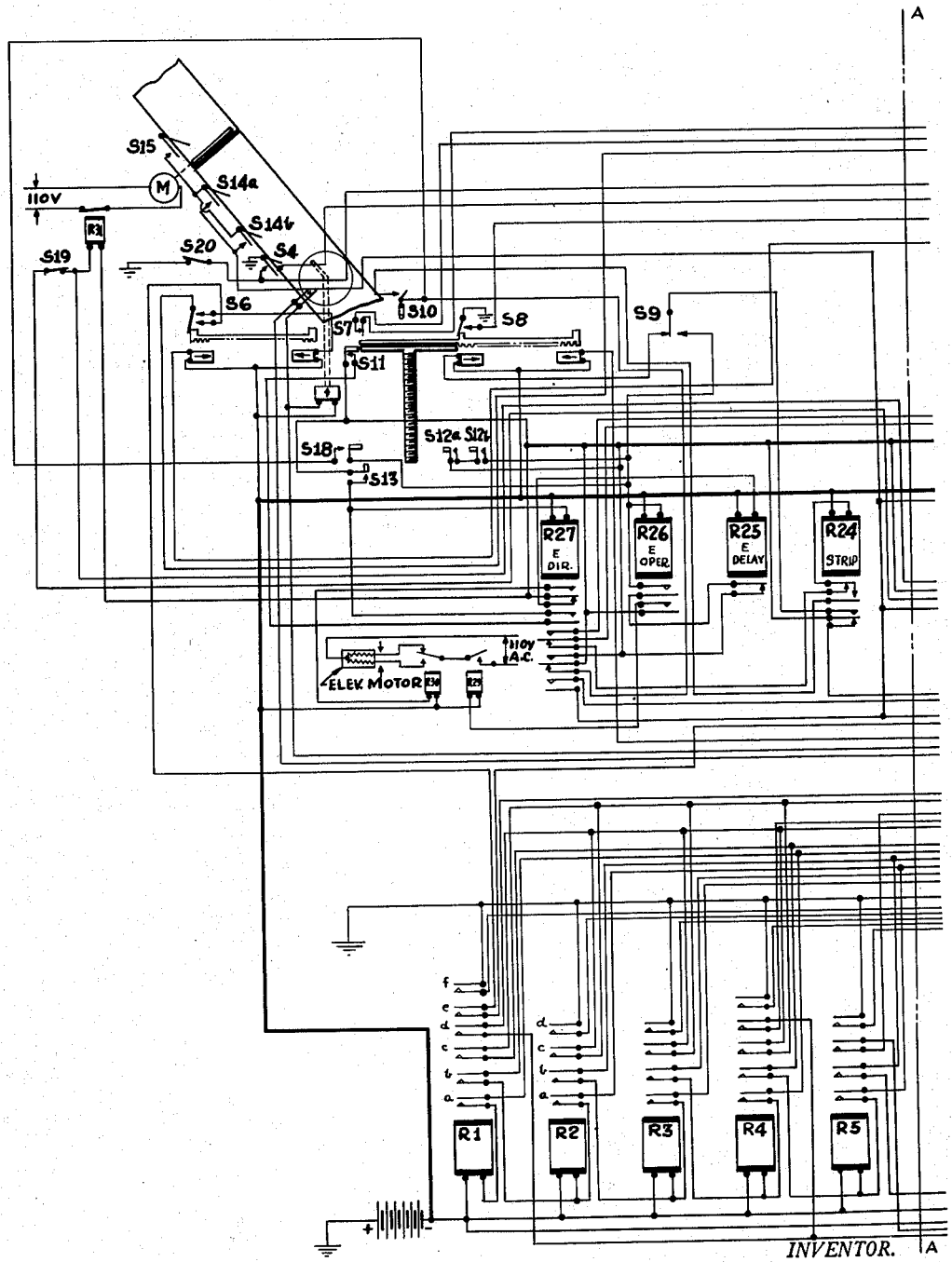
Figure 28B:
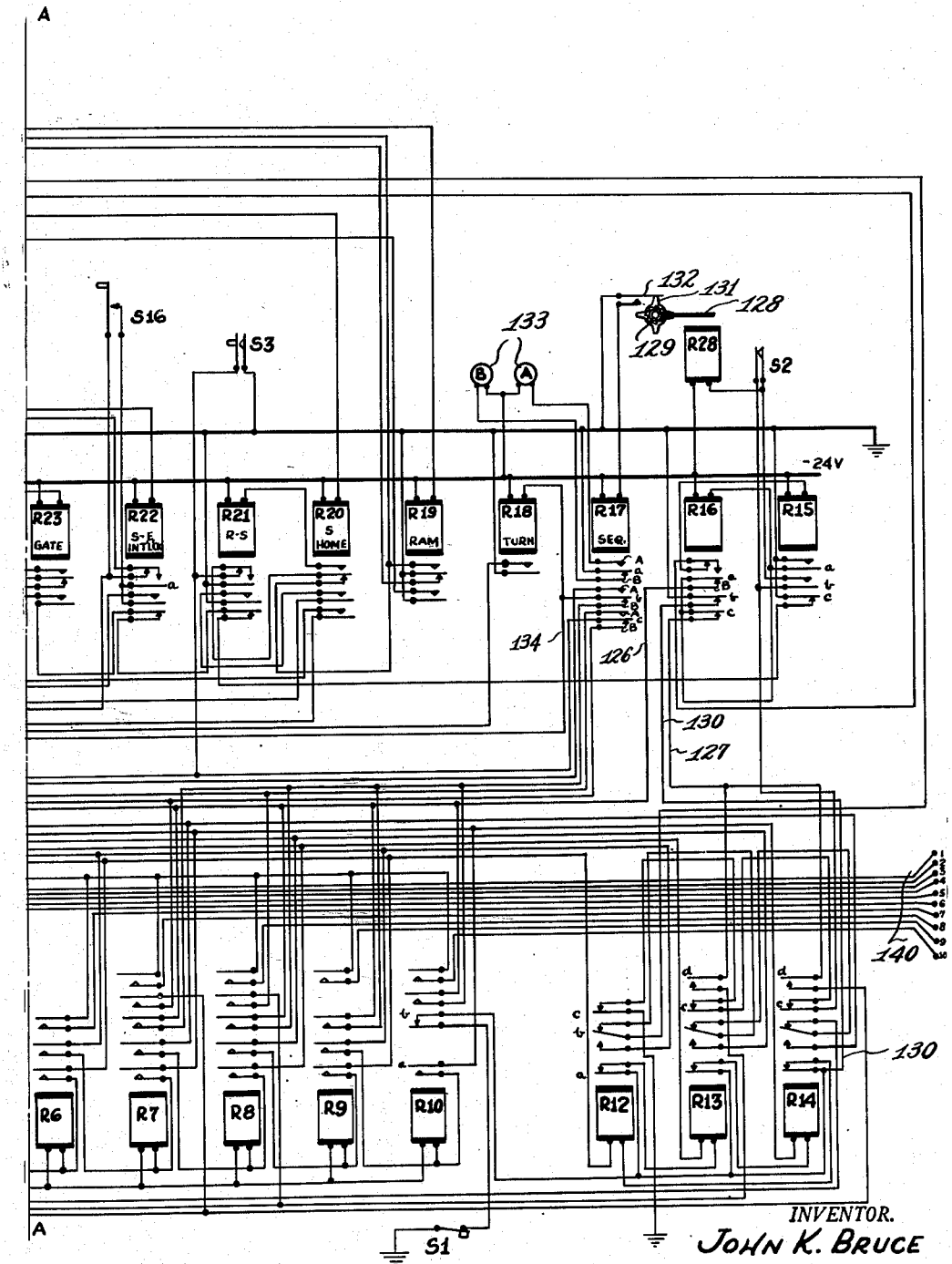

The various circuits of Figs. 19 to 27, inclusive, are combined into one master wiring diagram in Figs. 28A and 28B, which may be disposed side by side to complete the entire wiring diagram. The various circuit components previously identified are identified in Fig. 28 by the same symbols. The circuit includes, among other things, a manual switch S20 adapted to apply ground to one contact of switch S4 so as to manually step the counting chain the same as though S4 had been closed.

With respect to the counting chain (R1 to R10, inclusive), it will be noted that an extra set of contacts has been provided as the top contact for each relay. Thus when the counting relays are energized, these contacts will close circuits to operate lights 140 so that a visual indication may be obtained as to which unit of the counting chain is being operated.

The various manual switches, together with the indicator lights, may be disposed in a control panel 142 illustrated in Fig. 18 (Sheet 3). The counting lights 140 as well as the sequence lights 133 may be disposed on the outside of the panel. A stop switch button 143 may be placed on the outside of the panel so that all power to the palletizer may be quickly turned off for emergency stops. A hinged cover 144 may overlie the manual switches as well as overlying a starting button 145 for operating the main power switch to pass current to the palletizer as a whole. The cover may be locked, if desired, during operation to prevent tampering with the normal functioning of the palletizer.

While my invention has been described with reference to a specific embodiment, this has been for illustrative purpose only, as various structures, circuits, and modes of operation could be employed without departing from the true spirit and scope of my invention. For example, the general arrangement of the palletizer could be changed to dispense with an elevator, and instead the feed conveyors could be successively raised as layers were completed on a stationary pallet, as well as employing a stripper plate that could be successively raised. Furthermore, the pallet magazine mechanism could be independently powered rather than depending upon the elevator as a source of power. The magazine release mechanism could, for example, be controlled by an electrical circuit dependent upon elevator position, direction of movement, etc.

The turntable mechanism may take various forms, the only requirement being that it effect turning and then release the container for delivery to the loading platform. While I have shown a mechanism that lifts the box clear of the conveyor, this turning action could be built into the conveyor by having it split down the middle and operating one side at a different rate of speed from the other. Also an overhead clamp or pair of arms could engage the containers and rotate them regardless of the action of the conveyor.

The elevator could be of any construction, for example cable driven, hydraulically operated, lifted by a mechanical toggle, etc., but I find that electrically driven screws are satisfactory. The pallet engaging portion of the elevator could be of any construction.

Any type of operating mechanism could be employed for the stripper plate and the ram. For example hydraulic cylinders, screw drive, cable and pulley, etc., could be used. Also various types of prime movers could be employed.

Various types of conveyors could be substituted for those illustrated including chains, hooks on moving tables, belts, vibration conveyors, gravity feed conveyors, etc., but at present I prefer power driven rollers. Also, instead of stopping a conveyor to effect stoppage of the flow of containers, a mechanically operated gate could be imposed across the conveyor.

At present I prefer to employ the hanger arm switches illustrated for controlling the elevator downward movement. It will be appreciated, however, that a series of switches could be disposed along the elevator well so as to stop the elevator when it strikes one of these switches.

As stated previously, more than two layer patterns could be employed, and all that would be required would be a corresponding number of differentiating or sequence relay contacts. Also, individual boxes within a row could be rotated rather than entire rows as illustrated. Different numbers of boxes for different layers could be employed by cutting off the counting chain by appropriate connections with the sequence relay or its equivalent. Counting mechanisms other than the relay chain could be employed, for example rotating switches or ratchet-type linear actuators for aligned switches.

Pulsing could be accomplished by a rotary mechanism, electronic delay circuits, dash pots, etc. Further, electron tubes or valves could replace many of the switches or relay contacts of the circuit. Pulsing is not necessary, but is highly desirable in my circuit.

Although the ram operates a switch at the end of its ram stroke to actuate the return stroke, this return stroke could be operated by a time delay period, or by the return movement of a mechanical drive such as a rotary crank and connecting rod. Also, the stripper return could be mechanically effected by the elevator operating a mechanism when it reaches a pre-selected position on the down-stroke.

The gate control circuit could be operated responsive to the time interval between which containers engage a switch, for example a switch placed as is S14a or S4.

While electric interlocks have been described, mechanical interlocks could be used also.

For these and various other reasons, I do not limit myself to the disclosed embodiment, which is merely illustrative of one form of my invention, and is not limiting or definitive.

I claim:

1. A circuit for a palletizer of the type employing a loading platform from which containers are removed row by row by a ram until a pallet layer is formed, comprising: an electric counter responsive to the arrival of containers at the loading platform; and control circuits associated with certain numerals of the counter and including a control circuit to actuate the ram, whereby containers assembled on the loading platform may be periodically removed therefrom by the ram for assembly onto a pallet.

2. A circuit for a palletizer of the type employing a container conveyor, comprising: an electric counting chain; a pulse generator; a container feeler switch disposed on the conveyor; and circuits leading from the feeler switch to the counting chain and to the pulse generator, whereby contact of a container with the feeler switch will step off the counting chain, and release of the feeler switch by a container will operate the pulse generator.

3. A circuit for a palletizer that assembles layers of a pre-selected number of containers upon a pallet, which containers are received from a container conveyor, comprising: a relay counting chain; a chain actuator disposed along the container conveyor and responsive to passage of a container for actuating the chain; functional contacts actuated by each relay of the counting chain; a sequence selector connected to the functional contacts; and a circuit connected to the counting chain for periodic operation of the sequence selector whenever the counting chain completes a counting run.

4. In a palletizer wherein containers are fed by a conveyor to container turning means and thereafter to a loading platform whereat a ram forms them into a layer, a control circuit comprising: a counter having a numeral element for each container of a layer; a counter operator responsive to the passage of a container on the conveyor; ramming contacts on selected numeral elements; turning contacts on selected numeral elements; and control circuits extending from the contacts to the ram and the turning means, respectively, whereby selected packages formed in a row may be turned, and upon completion of the row the ram may be operated to assemble a layer of containers.

5. In a palletizer wherein containers are fed by a conveyor to container turning means and thereafter to a loading platform whereat a ram forms them into a layer on a sliding deck from which they are stripped to drop the containers onto a pallet, a control circuit comprising: a counter having a numeral element for each container of a layer; a counter operator responsive to passage of a package on the conveyor anterior to the turning means; ramming contacts on selected numeral elements; turning contacts on selected numeral elements; a stripping contact on at least one selected numeral element; and control circuits extending from the contacts to the ram, turning means and sliding deck, respectively.

6. In a palletizer wherein containers are fed by a conveyor to container turning means and thereafter to a loading platform whereat a ram forms them into a layer, a control circuit for forming layers of different geometric patterns, comprising: a counter having a numeral element for each container of a layer; a counter operator responsive to passage of a container on the conveyor; ramming contacts on selected numeral elements; turning contacts on selected numeral elements; a sequence relay having at least two separate contacts through which a circuit may be closed; conductors leading selectively from the contacts to either one of the sequence relay contacts; and control circuits extending from the sequence relay to the ram and turning means, respectively, whereby containers of one layer may be disposed in a different geometric pattern from those of a succeeding layer by operating the sequence relay between layers.

7. In a palletizer control circuit employing functional relays having self-holding circuits, a pulse generator for initially operating the functional relays comprising: a pair of relays, the first of which is slow to release and the second of which is slow to operate; a circuit extending from the contacts of the first to the terminals of the second to energize the second relay when the first relay has been operated; a circuit passing through normally closed contacts of the second relay for operating the first relay; and a series circuit extending through normally closed contacts of the second relay and normally open contacts of the first relay, whereby energizing the first relay will close the series circuit and will initiate operation of the second relay, which relay will be slow to operate and thereby give rise to the pulse during the time that the series circuit is closed.

8. A palletizer comprising: an elevated sliding deck; an elevator disposed below the normal position of the sliding deck and adapted to support a pallet; a power source for operating the elevator; means for loading containers on the deck; means for sliding the deck from under a layer of containers; a control for the elevator source operated by the sliding deck when in its retracted position; a stopping control for the elevator; and means for actuating the stopping control when the elevator has descended a preselected distance, at which point the containers will be disposed below the normal level of the sliding deck.

9. A palletizer as defined in claim 8 wherein the stopping control actuating means includes hanger arms pivotally mounted above the normal position of the sliding deck and which actuate the control upon arriving at a pre-selected angular position as they follow down the tops of the containers on the descending elevator.

10. In a palletizer capable of producing different succeeding layer patterns: a turntable for engaging a container and rotating it; a motor for lifting the turntable to engage a container; a relay for passing power to the motor; a self-holding circuit for the relay including a switch disposed adjacent to the turntable; and a rotating finger on the turntable that rotates with the turntable when the motor is energized and is so spaced relative to the switch as to open the switch upon rotation, whereby the rest position of the finger and the position of the switch may be pre-selected to give a desired amount of rotation to a container so that contact of the finger with the switch will open the self-holding circuit and cause release of the relay to stop the flow of power to the motor.

11. In a palletizer wherein rows of containers are rammed into a loading position: a reciprocating ram having an extend control and a return control; a relay for the extend control; a circuit for energizing the relay and including a normally closed first switch that is opened when the ram reaches the end of its ram stroke; self-holding contacts on the relay for establishing a holding circuit through the switch; normally closed contacts on the relay for passing current to the return control; and a circuit extending from the normally closed contacts through a second switch normally open when the ram is in its rest position and extending to the return control, whereby a ram pulse will operate the relay which in turn will establish a self-holding circuit through the first switch, and at the end of the ram stroke this self-holding circuit will be opened, causing the relay to be deenergized to apply power through the second switch to return the ram.

12. A palletizer comprising: a stripper plate upon which a layer of containers may be assembled; an elevator located below the normal position of the stripper plate; a power drive for the stripper plate including a strip control and an extend control; a relay for operating the strip control; a circuit extending from normally open contacts of the relay through a normally closed first switch to the strip control, which first switch may be mechanically opened by the stripper plate when it reaches a retracted position; a second switch that is normally open when the stripper plate is in its rest position over the elevator; a circuit for the extend control of the stripper plate power drive extending from normally closed contacts of the relay, which circuit is closed when the second switch is closed; and a self-holding circuit for the relay including a hanger arm switch disposed above the stripper plate, whereby a layer of containers on the stripper plate will close the hanger arm switch and subsequent energization of the relay will pass a current through the first switch to operate the strip control, which control will be interrupted when the first switch is opened by the retracted stripper plate, and the relay will be energized until the hanger arm switch is opened by the operation of the elevator, and the deenergization of the relay will operate the extend control to return the stripper plate.

13. A palletizer comprising: a stripper plate; an elevator disposed below the normal position of the stripper plate; a reversible motor drive for the elevator; an operate relay for the motor; an elevator direction relay energized upon upward movement of the elevator and controlling the elevator direction; a normally closed top limit switch for the elevator connected through normally open contacts of the direction relay for operating the relay; an intermediate keep-alive switch disposed along the path of the elevator and normally open; a normally open bottom limit switch closed when the elevator reaches its bottom position and connected to energize the direction relay; a pallet switch closable when a fresh pallet is in position for lifting by the elevator; a stripper plate retract position switch that is normally open, and is closed when the stripper plate is retracted to energize the elevator operate relay; means for returning the stripper plate when the elevator has descended a pre-selected distance to thereby open the stripper plate switch and stop the downward movement of the elevator; a circuit extending from the operate relay through the keep-alive switch and passing through normally closed contacts of the direction relay to maintain the downward movement of the elevator when it engages the keep-alive switch; and a self-holding circuit for the operate relay that is established when the direction relay is deenergized, whereby the lowermost position of the elevator will operate the lower limit switch, energizing the direction relay to thereby open the keep-alive circuit and stop the downward movement of the elevator, and thereafter a fresh pallet striking the pallet switch will reenergize the elevator operate relay to cause the elevator to rise until it strikes the upper limit switch, causing the self-holding circuit of the direction relay to be opened and in turn opening the self-holding circuit for the operate relay.

14. A conveyor gate control for a palletizer comprising: a control conveyor; a continuously operating conveyor; a pair of feeler switches disposed on the operating conveyor and connected in series; a feeler switch disposed on the control conveyor adjacent the operating conveyor and series connected with the operating conveyor switches; a motor drive for the control conveyor; a relay for controlling the motor; a fourth feeler switch disposed posterior to the other switches with regard to the direction of movement of the conveyor; and a self-holding circuit for the relay that is broken only after operation of the fourth switch.

15. In a palletizer having an elevator for a pallet and having a stripper plate that receives containers while the elevator is discharging a loaded pallet and elevating a new pallet, an interlock circuit comprising: a relay energized on elevator upward movement; a strip operate relay; an interlock relay; a strip circuit passing through normally closed contacts of the interlock relay and passing through normally closed contacts on the direction relay to energize the strip relay; a control circuit for the interlock relay including an armature on the direction relay which when the direction relay is energized opens the normally closed strip circuit contacts and connects the strip circuit to the interlock relay; and a self-holding circuit for the interlock relay that interrupts the strip circuit through the contacts of that relay, whereby a strip impulse will be diverted to operate the interlock relay when the elevator is moving upwardly to thereby prevent the dumping of containers upon a pallet not in proper position, and when the elevator ceases upward movement and the direction relay is deenergized, the strip impulse will be obtained through the interlock relay self-holding circuit.

16. In a palletizer wherein a ram delivers rows of containers to a stripper plate, an interlock circuit comprising: a ram operate relay; a strip home position relay that is deenergized when the stripper plate is in position to receive containers; an interlock relay connected to a normally open contact of the home relay; a ram circuit extending through normally closed contacts on the interlock relay and through normally closed contacts on the home relay to the ram relay; and a self-holding circuit for the interlock relay extending through the normally open contact of the home relay, whereby a retracted position of the stripper plate will cause the home relay to be energized to divert a ram impulse to the interlock relay and thereby energize it, and the interlock relay will remain energized until the stripper plate is in proper home position, at which time the interlock circuit will deliver a ram current to the ram relay.

17. A palletizer comprising: a container conveyor; a ram; a stripper plate for receiving rows of containers delivered by the ram; an elevator for receiving layers of containers when the stripper plate is retracted; a gate on the container conveyor; an interlock circuit operated when a ram signal is delivered and the stripper plate is not in a position to receive containers; an interlock circuit operated when a stripper signal arrives and the elevator is not in a position to receive a layer of containers; and a circuit for operating the gate that is closed whenever either interlock circuit is energized.

18. A pallet loading machine comprising an entering conveyor, a loading platform onto which cartons are discharged by said entering conveyor, said loading platform being adapted to propel cartons entering the machine in single file toward the end of said platform, a sliding deck having a normal position adjacent said platform, a ram for pushing cartons from said platform to said deck, elevator means for supporting a pallet at selected distances below the normal position of said deck, said sliding deck being retractable to deposit a layer of cartons on said pallet, power means for operating said sliding deck, ram and elevator means, and electrical control mechanism for actuating said power means in a predetermined cycle comprising a counting chain progressively stepped by the entrance of each carton into the machine.

19. A pallet loading machine comprising an entering conveyor, a loading platform onto which cartons are discharged by said entering conveyor, said loading platform being adapted to propel cartons entering the machine in single file toward the end of said platform, means associated with said entering conveyor for rotating pre-selected cartons through substantially 90°, a sliding deck having a normal position adjacent said platform, a ram for pushing cartons from said platform to said deck, elevator means for supporting a pallet at selected distances below the normal position of said deck, said sliding deck being retractable to deposit a layer of cartons on said pallet, power means for operating said rotating means, sliding deck, ram and elevator means, and electrical control mechanism for actuating said power means in a predetermined cycle comprising a counting chain progressively stepped by the entrance of each carton into the machine.

20. A pallet loading machine comprising an entering conveyor, a loading platform onto which cartons are discharged by said entering conveyor, said loading platform being adapted to propel cartons entering the machine in single file toward the end of said platform, a retractable carton stop gate located between said entering conveyor and said loading platform, means associated with said entering conveyor for rotating pre-selected cartons through substantially 90°, a sliding deck having a normal position adjacent said platform, a ram for pushing cartons from said platform to said deck, elevator means for supporting a pallet at selected distances below the normal position of said deck, said sliding deck being retractable to deposit a layer of cartons on said pallet, power means for operating said rotating means, sliding deck, ram, gate and elevator means, and electrical control mechanism for actuating said power means in a predetermined cycle comprising a counting chain progressively stepped by the entrance of each carton into the machine.

21. A loading machine of the character described having a conveyor for feeding boxes to a transfer sheet placed upon an elevator, a pusher for moving the boxes from the conveyor onto the transfer sheet to form tiers of boxes thereupon, a supply of fresh transfer sheets, means for supporting the same in position to be placed upon the said elevator, means for moving the loaded transfer sheet away from the machine and simultaneously therewith moving one of said fresh transfer sheets onto the elevator to receive a subsequent load of boxes, and mechanisms for operating said pusher and said transfer sheet moving means.

22. A loading machine according to claim 21 including an auxiliary load-receiving plate adapted to receive boxes from the said conveyor, and means for moving said plate into box-receiving position above a tier of boxes previously loaded upon the said transfer sheet to receive the next tier of boxes and for retracting said plate from underneath the boxes placed upon the plate as the boxes are formed into tiers upon said transfer sheet.

23. In a palletizer comprising: an elevated sliding deck; and elevator disposed below the normal position of the sliding deck and adapted to elevate a pallet; a container conveyor terminating in a loading platform at one side of the deck; and a ram for sliding a row of containers from the platform to the deck, whereby rows of containers may be successively assembled on the loading platform and thereafter rammed onto the deck until an entire pallet layer is obtained, whereupon the deck may then be slid to strip it from under the containers and drop the containers onto a pallet; the combination of container turning means located along the container conveyor anterior to the loading platform whereby containers may be selectively rotated to a desired angular position prior to being assembled in rows on the loading platform.

24. In a palletizer comprising: an elevated sliding deck; an elevator disposed below the normal position of the sliding deck and adapted to elevate a pallet; a container conveyor terminating in a loading platform at one side of the deck; and a ram for sliding a row of containers from the platform to the deck, whereby rows of containers may be successively assembled on the loading platform and thereafter rammed onto the deck until an entire pallet layer is obtained, whereupon the deck may then be slid to strip it from under the containers and drop the containers onto a pallet; the combination of an operating control for the elevator; and actuating means for the control including hanger arms pivotally mounted above the normal position of the sliding deck, said control and hanger arms being so constructed and arranged that the lowering action of the elevator will be stopped when the hanger arms assume a pre-selected position while riding on top of the stripped layer of containers being lowered.

JOHN K. BRUCE.

REFERENCES CITED

The following references are of record in the file of this patent:

UNITED STATES PATENTS

| Number | Name | Date |
|---|---|---|
| 655,337 | French | Aug. 7, 1900 |
| 1,247,722 | Rogers et al. | Nov. 27, 1917 |
| 1,373,513 | Ladd | Apr. 5, 1921 |
| 1,545,225 | Zeh | July 7, 1925 |
| 1,579,545 | Langsdorf | Apr. 6, 1926 |
| 1,639,576 | Semashko | Aug. 16, 1927 |
| 1,646,381 | Roberts | Oct. 18, 1927 |
| 1,661,969 | Semashko | Mar. 6, 1928 |
| 1,750,391 | Coyle et al. | Mar. 11, 1930 |
| 1,785,374 | Bronson | Dec. 16, 1930 |
| 1,832,344 | Wittman | Nov. 17, 1931 |
| 1,886,378 | Dearsley | Nov. 8, 1932 |
| 1,914,806 | Hormel | June 20, 1933 |
| 2,113,926 | Pierce | Apr. 12, 1938 |
| 2,181,357 | Chipman | Nov. 28, 1939 |
| 2,228,887 | Peterson | Jan. 14, 1941 |
| 2,279,420 | Thum | Apr. 14, 1942 |
| 2,418,091 | Pandoff | Mar. 25, 1947 |
| 2,443,202 | Smith | June 15, 1948 |
| 2,508,861 | Jessen | May 23, 1950 |